US008414806B2

(12) United States Patent
Sun et al.

(10) Patent No.: US 8,414,806 B2
(45) Date of Patent: Apr. 9, 2013

(54) MEMBRANE MADE OF A NANOSTRUCTURED MATERIAL

(75) Inventors: Darren Delai Sun, Singapore (SG); Xiwang Zhang, Singapore (SG); Jianghong Alan Du, Singapore (SG); James O Leckie, Stanford, CA (US)

(73) Assignees: Nanyang Technological University, Singapore (SG); The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 12/161,555

(22) PCT Filed: Mar. 28, 2008

(86) PCT No.: PCT/SG2008/000101
§ 371 (c)(1),
(2), (4) Date: Jul. 18, 2008

(87) PCT Pub. No.: WO2009/120151
PCT Pub. Date: Oct. 1, 2009

(65) Prior Publication Data
US 2010/0233812 A1    Sep. 16, 2010

(51) Int. Cl.
*C04B 35/653* (2006.01)
*B28B 1/26* (2006.01)
*B29C 65/00* (2006.01)
*B01D 61/00* (2006.01)
*B32B 3/00* (2006.01)

(52) U.S. Cl. ............ 264/86; 264/87; 264/319; 264/332; 264/628; 264/DIG. 48; 156/296; 210/650; 210/651; 428/312.2

(58) Field of Classification Search .................. 427/244; 210/650, 651; 264/86, 87, 628, DIG. 48, 264/319, 332
See application file for complete search history.

(56) References Cited

U.S. PATENT DOCUMENTS

| 7,105,596 | B2* | 9/2006 | Smalley et al. ............... 524/495 |
| 2006/0068668 | A1 | 3/2006 | Kameoka et al. |
| 2006/0137817 | A1* | 6/2006 | Ma et al. ....................... 156/296 |
| 2006/0207931 | A1* | 9/2006 | Liang et al. ............. 210/500.21 |
| 2006/0226580 | A1* | 10/2006 | Xia et al. ...................... 264/465 |
| 2007/0084797 | A1* | 4/2007 | Cooper et al. ................ 210/660 |
| 2007/0134491 | A1* | 6/2007 | Atsuki et al. .................. 428/402 |

FOREIGN PATENT DOCUMENTS
WO    WO 2005023702 A1 *  3/2005

OTHER PUBLICATIONS

Yu et al. (The effect of calcination temperature on the surface microstructure and photocatalytic activity of TiO2 thin films prepared by liquid phase deposition. J. Phys. Chem. B 2003, 107, pp. 13871-13879.).*
Armor, J.N., Applications of catalytic inorganic membrane reactors to refinery products, Journal of Membrane Science 147(2):217-233 (1998).
Armstrong, A.R. et al., TiO$_2$-B Nanowires, Angewandte Chemie International Edition 43:2286-2288 (2004).

(Continued)

*Primary Examiner* — Christina Johnson
*Assistant Examiner* — Atul P Khare
(74) *Attorney, Agent, or Firm* — Seed IP Law Group PLLC

(57) ABSTRACT

The present invention refers to a method of fabricating a membrane made of a nanostructured material and its use.

22 Claims, 13 Drawing Sheets

OTHER PUBLICATIONS

Armstrong, A.R., Canales, J. and Bruce, P., WO$_2$Cl$_2$ Nanotubes and Nanowires, Angewandte Chemie International Edition 43:4899-4902 (2004).

Bender, E.T. et al., Spectroscopic investigation of the composition of electrospun titania nanofibers, Surf. Interface Anal. 38:1252-1256 (2006).

Bognitzki, M., et al., Polymer, Metal, and Hybrid Nano- and Mesotubes by Coating Degradable Polymer Template Fibers (TUFT Process), Adv. Mater. 12(9):637-640 (2000).

Bong, et al., Self-Assembling Organic Nanotubes, Angew. Chem. Int. Ed. 40:988-1011 (2001).

Campbell, R. et al., Preparation of mesoporous silica terriplated metal nanowire films on foamed nickel substrates, Microporous and Mesoporous Materials 97:114-121 (2006).

Casper, C.L. et al., Controlling Surface Morphology of Electrospun Polystyrene Fibers: Effect of Humidity and Molecular Weight in the Electrospinning Process, Macromolecules 37(2):573-578 (2004).

Kim et al., Magnetic anisotropy of vertically aligned α-Fe$_2$O$_3$ nanowire array, Applied Physics Letters 89:223103(1-3) (2006).

Chen, X. and Mao, S.S., Titanium Dioxide Nanomaterials: Synthesis, Properties, Modifications, and Applications, Chem. Rev. 107:2891-2959 (2007).

Chen, Y. et al., Preparation of a Novel TiO$_2$-Based p-n Junction Nanotube Photocatalyst, Environ. Sci. & Technol. 39(5):1201-1208 (2005).

Choi, K. et al., Growth of Ga$_2$O$_3$ and GaP nanowires synthesized from mixed Ga/GaP powder as a precursor, Colloids and Surfaces A: Physicochemical and Engineering Aspects 313-314:60-65 (2008).

Dalton, P.D. et al., Direct in Vitro Electrospinning with Polymer Melts, Biomacromolecules 7:686-690 (2006).

Daoud, W.A. and Pang, G.K.H., Direct Synthesis of nanowires with Anatase and TiO$_2$-B Structures at near Ambient Conditions, J. Phys. Chem. B. 110:25746-25750 (2006).

Dong, W. et al., Multifunctional, Catalytic Nanowire Membranes and the Membrane-Based 3D Devices, J. Phys. Chem. B. 110:16819-16822 (2006).

Elias, J., Tena-Zaera, R., and Lévy-Clément, C., Electrodeposition of ZnO nanowires with controlled dimensions for photovoltaic applications: Role of buffer layer, Thin Solid Films, 515:8553-8557 (2007).

Fan, S. et al., Self-Oriented Regular Arrays of Carbon Nanotubes and Their Field Emission Properties, Science 283(512):512-514 (1999).

Fang, H. et al., Removal of humic acid foulant from ultrafiltration membrane surface using photocatalytic oxidation process, Water Science & Technology, 51(6-7):373-380 (2005).

Fei, X.L. et al., Fabrication and magnetic properties of Fe-Pd nanowire arrays, Solid State Communications, 141:25-28 (2007).

Fox, M.A. and Dulay, M.T., Heterogenous Photocatalysis, Chem. Rev., 93:341-357 (1993).

Fujishima, et al., Titanium dioxide photocatalysis, J. Photochem. Photobio. C. 1:1-21 (2000).

Gogotsi, Y., Libera, J.A. and Yoshimura, M., Hydrothermal synthesis of multiwall carbon nanotubes, J. Mater. Res., 15(12):2591-2594 (2000).

Gopal, R. et al., Electrospun nanofibrous polysulfone membranes as pre-filters: Particulate removal, J. Membrane Science, 289:210-219 (2007).

Gu, G. et al., V$_2$O$_5$ nanofibre sheet actuators, Nature Materials, 2:316-319 (2003).

Hidalgo, M.C. et al., Hydrothermal preparation of highly photoactive TiO$_2$ nanoparticles, Catalysis Today, 129:50-58 (2007).

Hoffmann, M.R. et al., Environmental applications of Semiconductor Photocatalysis, Chem. Rev., 95:69-96 (1995).

Hong, W. et al., Electrical properties of ZnO nanowire field effect transistors by surface passivation, Colloids and Surfaces A: Physiochem. Eng. Aspects, 313-314:378-382 (2008).

Huang, Z. et al., A review on polymer nanofibers by electrospinning and their applications in nanocomposites, Composites Science and Technology, 63:2223-2253 (2003).

Huang, S., Dai, L. and Mau, A.W.H., Controlled Fabrication of Large-Scale Aligned Carbon Nanofiber/Nanotube Patterns by Photolithography, Advanced Materials, 14(16):1140-1143 (2002).

Iijima, Sumio, Helical microtubules of graphitic carbon, Nature 354:56-58 (1991).

Jarusuwannapoom, T. et al., Effect of solvents on electro-spinnability of polystyrene solutions and morphological appearance of resulting electrospun polystyrene fibers, European Polymer Journal, 41:409-421 (2005).

Jo, G. et al., Structural and electrical characterization of intrinsic n-type In$_2$O$_3$ nanowires, Colloids and Surfaces A: Physicochem. Eng. Aspects 313-314:308-311 (2008).

Jung, J.H. et al., Creation of Novel Helical Ribbon and Double-Layered Nanotube TiO$_2$ Structures Using an Organogel Template, Chem. Matter. 14:1445-1447 (2002).

Kasuga, T. et al., Formation of Titanium Oxide Nanotube, Langmuir 14:3160-3163 (1998).

Kerres, J.A., Development of ionomer membranes for fuel cells, J. Membrane Science, 185(1):3-27 (2001).

Kolen'ko, Y.V. et al., Photocatalytic properties of titania powders prepared by hydrothermal method, Applied Catalysis B: Environmental 54:51-58 (2004).

Konstantinou, I.K. and Albanis, T.A., TiO$_2$-assisted photocatalytic degradation of azo dyes in aqueous solution: kinetic and mechanistic investigations A Review, Applied Catalysis B: Environmental 49:1-14 (2004).

Koros and Fleming, Membrane-based gas separation, J. Membrane Science 83:1-80 (1993).

Larsen et al., A Method for Making Inorganic and Hybrid (Organic/Inorganic) Fibers and Vesicles with Diameters in the Submicrometer and Micrometer Range via Sol—Gel Chemistry and Electrically Forced Liquid Jets, J. Am. Chem. Soc., 125:1154-1155 (2003).

Li, D. and Xia, Y., Electrospinning of Nanofibers: Reinventing the Wheel?, Adv. Mater. 16(14):1151-1170 (2004).

Li, X.Z. and Liu, H. et al., Photocatalytic Oxidation Using a New Catalyst—TiO$_2$ Microsphere—for Water and Wastewater Treatment, Environ. Sci. Technol. 37(17):3989-3994 (2003).

Lin, Shih-Chin, et al., Electrochemical fabrication and magnetic properties of highly ordered silver-nickel core-shell nanowires, Journal of Alloys and Compounds 449:232-236 (2008).

Liu, H. and Hsieh, Y., Ultrafine Fibrous Cellulose Membranes from Electrospinning of Cellulose Acetate, Journal of Polymer Science: Part B: Polymer Physics, 40:2119-2129 (2002).

Liu, Z. et al., An Efficient Bicomponent TiO$_2$/SnO$_2$ Nanofiber Photocatalyst Fabricated by Electrospinning with a Side-by-Side Dual Spinneret Method, Nano. Lett. 7(4):1081-1085 (2007).

Lyons, J. and Ko, F., Melt Electrospinning of Polymers: A Review, Polymer News, 30:170-178 (2005).

Madaeni, The Application of Membrane Technology for Water Disinfection, Wat. Res. 33(2):301-308 (1999).

Madhugiri, S. et al., Electrospun mesoporous titaniuim dixodide fibers, Microporous and mesoporous Materials (69):77-83 (2004).

McCann, J.T., Li, D., and Xia, Y., Electrospinning of nanofibers with core-sheath, hollow, or porous structures, J. Mater. Chem. 15:735-738 (2005).

Molinari, R. et al., Studies on various reactor configurations for coupling photocatalysis and membrane processes in water purification, J. Membr. Sci. 206:399-415 (2002).

Musin, R.N. and Wang, X., Quantum size effect in core-shell structured silicon-germanium nanowires, Physical Review B 74:165308 (1-5) (2006).

Nakao, Shin-ichi, Determination of pore size and pore size distribution 3. Filtration membranes, J. Membr. Sci. 96:131-165 (1994).

Nolan, M. et al., Silicon Nanowire Band Gap Modification, Nano Letters 7(1):34-38 (2007).

Norris, I.D. et al., Electrostatic fabrication of ultrafine conducting fibers: polyaniline/polyethylene oxide blends, Synthetic Metals 114:109-114 (2000).

Pavasupree, S. et al., Synthesis of titanate, TiO$_2$ (B), and anatase TiO$_2$ nanofibers from natural rutile sand, J. Solid State Chemistry, 178:3110-3116 (2005).

Ren, S. et al., Catalyst-free synthesis of ZnO nanowire arrays on zinc substrate by low temperature thermal oxidation, Materials Letters 61:666-670 (2007).

Reneker, D.H., and Chun, I., Nanometre diameter fibres of polymer, produced by electrospinning, Nanotechnology 7:216-213 (1996).

Routkevitch, D. et al., Electrochemical Fabrication of CdS Nanowire Arrays in Porous Anodic Aluminum Oxide Templates, J. Phys. Chem. 100:14037-14047 (1996).

Shi, Y. et al., Templated fabrication, characterization and electrocatalysis of cobalt hexacyanoferrate nanotubes, Journal of Electroanalytical Chemistry 611:1-9 (2007).

Sigmund, W. et al., Processing and Structure Relationships in Electrospinning of Ceramic Fiber Systems, J. Am. Ceram. Soc. 89(2):395-407 (2006).

Singh, S. et al., Membrane characterization by solute transport and atomic force microscopy, J. Membrane Sci., 142:111-127 (1998).

Smitha, B., Sridhar, S. and Khan, A.A., Solid polymer electrolyte membranes for fuel cell applications—a review, Journal of Membrane Science 259:10-26 (2005).

Subbiah, T. et al., Electrospinning of Nanofibers, J. Applied Polymer Science 96:557-569 (2005).

Tenne, Reshef, Inorganic Nanotubes and Fullerene-Like Materials, Chem. Eur. J. 8(23):5297-5304 (2002).

Theron, S.A., Zussman, E. and Yarin, A.L., Experimental investigation of the governing parameters in the electrospinning of polymer solutions, Polymer, 45:2017-2030 (2004).

Tian, Z.R. et al., Large Oriented Arrays and Continuous Films of $TiO_2$-based Nanotubes, J. Am. Chem. Soc. 125:12384-12385 (2003).

Tsai, C.C. and Teng, H., Structural features of nanotubes synthesized from NaOH treatment on $TiO_2$ with different port-treatments. Chem. Mater. 18(2):367-373 (2006).

Van Gestel, T. et al., Alumina and titania multilayer membranes for nanofiltration: preparation, characterization and chemical stability, J. Membr. Sci. 207:73-89 (2002).

Van Vugt and Vanmaekelberg, Phase-Correlated Nondirectional Laser Emission from the End Facets of a ZnO Nanowire, Phase-Correlated Nondirectional Laser Emission from the End Facets of a ZnO Nanowire, Nano Lett. 6(12):2707-2711 (2006).

Wang, X. et al., Formation of water-resistant hyaluronic acid nanofibers by blowing-assisted electro-spinning and non-toxic post treatments, Polymer 46:4853-4867 (2005).

Wang, Y.D., Zang, K.Y., and Chua, S.J., Catalyst-free growth of uniform ZnO nanowire arrays on prepatterned substrate, Applied Physics Letters, 89:263116(1-3) (2006).

Wu, Chien, et al., Synthesis and optical propeties of CuS nanowires fabricated by electrodeposition with anodic alumina membrane, Materials Letters 62:1074-1077 (2008).

Xie, C. et al., Surface Molecular Self-Assembly Strategy for TNT Imprinting of Polymer nanowire/Nanotube Arrays, Anal. Chem. 78:8339-8346 (2006).

Yao, B.D. et al., Formation mechanism of $TiO_2$ nanotubes, Applied Physics Letters, 82(2):281-283 (2003).

Yarin, AL., Koombhongse, S. and Reneker, D.H., Taylor cone and jetting from liquid droplets in electrospinning of nanofibers, J. Applied Physics 90(9):4836-4846 (2001).

Yeong, K.S. and Thong, J.T.L., Field-emission properties of ultrathin 5 nm tungsten nanowire, J. Applied Physics 100:114325 (1-6) (2006).

Yoshida, R., Suzuki, Y., and Yoshikawa, S., Syntheses of $TiO_2(B)$ nanowires and $TiO_2$ anatase nanowires by hydrothermal and post-heat treatments, J. Solid State Chemistry 178:2179-2185 (1-6) (2005).

Yu, J. et al., The Effect of Calcination Temperature on the Surface Microstructure and Photocatalytic Activity of $TiO_2$ Thin Films Prepared by Liquid Phase Deposition, J. Phys. Chem. B. 107:13871-13879 (2003).

Yuan, J. et al., Spontaneous Formation of Inorganic Paper-Like Materials, Adv. Mater. 16(19):1729-1732 (2004).

Yuan, X., et al., Morphology of ultrafine polysulfone fibers prepared by electrospinning, Polym Int. 53:1704-1710 (2004).

Yuan, W., and Zydney, A.L., Humic acid fouling during microfiltration, J. Membr. Sci. 157:1-12 (1999).

Yuan, Z.-Y. and Su, B.-L., Titanium oxide nanotubes, nanofibers and nanowires, Colloids and surfaces A: Physicochem. Eng. Aspects 241:173-183 (2004).

Zaman, J. and Chakma, A., Inorganic membrane reactors, J. Memb. Sci. 92:1-28 (1994).

Zhang, H. et al., Electrochemical Lithium Storage of Titanate and Titania Nanotubes and Nanorods, J. Phys. Chem. C. 111:6143-6148 (2007).

Zhang et al., Effect of operating parameters on microwave assisted photocatalytic degradation of azo dye X-3B with grain $TiO_2$ catalyst, J. Molecular Catalysis A: Chemical 237:199-205 (2005).

Zhao, Y., Jun, J. and Yang, X., Hydrothermal synthesis of titanate nanowire arrays, Materials Letters 61:384-388 (2007).

Zheng, J. et al., Studies on the controlled morphology and wettability of polystyrene surfaces by electrospinning or electrospraying, Polymer 47:7095-7102 (2006).

* cited by examiner

MEMBRANE MADE OF A NANOSTRUCTURED MATERIAL

FIELD OF THE INVENTION

The present invention refers to a method of fabricating a membrane made of a one dimensional (1D) nanostructured material and its use.

BACKGROUND OF THE INVENTION

High efforts are devoted to the study of 1D nanostructured material like nanotubes nanofibers and nanowires due to the unique physical and chemical properties associated with the structural confinements in nanoscale. However, from the engineering application point of view, separation and recovery is still a huge obstacle for these 1D nanostructured materials. Most recently, some efforts have been devoted to fabricated paper, sheet, membrane and other devices.

For example, metal oxide nanowires and carbon nanotubes have been organized into paper-like free standing membranes (FSM) for new applications (Yuan, J., Laubernds, K., et al., 2004, Adv. Mater., vol. 16, p. 1729; Endo, M., Muramatsu, H., et al., 2005, Nature, vol. 433, p. 476). However, a main problem of the materials obtained from nanostructured material remains their weak mechanical strength.

Dong, W., Cogbill, A., et al. (2006, J. Of Physical Chemistry B Letters, vol. 110, p. 16819) report a hydrothermal synthesis of $TiO_2$-based long nanowire catalysts that have been directly cast into FSM-based paper and devices (e.g. tube, bowl, cup).

US 2006/0068668 A1 describes nanofiber filters supported by microfibers which are supposed to enhance the mechanical strength of the filters described in this US application.

Due to their weak uniformity the mechanical strength and pore size distribution of these membranes remain a need for further improvement.

SUMMARY OF THE INVENTION

The present invention refers to a method of fabricating a membrane made of a (1D) nanostructured material, wherein the method comprises:

a. preparing a suspension comprising at least one 1D nanostructured material and at least one surfactant;
b. filtering the suspension through a porous substrate; and
c. drying the membrane formed on the substrate.

In another aspect the present invention refers to the use of a membrane obtained by the method of the present invention for filtering wastewater, filtering air, catalytically splitting water, cracking oil, making protection mask and armor, fabricating flame-retardant fabric, photo-assisted rewriting, sensing or regeneration of tissue.

In another aspect the present invention refers to a membrane obtained by a method according to the present invention and in still another aspect the present invention refers to a method of cleaning wastewater comprising filtering wastewater through a membrane of the present invention or a membrane obtained according to the method of the present invention.

BRIEF DESCRIPTION OF THE DRAWINGS

The invention will be better understood with reference to the detailed description when considered in conjunction with the non-limiting examples and the accompanying drawings, in which:

FIG. 1b refers to a flowchart exemplifying the manufacture of a membrane made of $TiO_2$ nanofibers or nanotubes which have been obtained by hydrothermal synthesis.

FIG. 2 refers to two flowcharts exemplifying the manufacture of a membrane made of $TiO_2$ nanofibers which have been obtained by electrospinning instead of hydrothermal synthesis.

FIG. 3 refers to a flowchart exemplifying the manufacture of a membrane made of $TiO_2$ nanofibers which have been obtained by electrospinning. The difference to the method illustrated in FIG. 2 is the fact that the electrospun material has already been calcined before being dissolved and mixed with the surfactant.

In FIG. 4a a vacuum is applied via a vacuum pump (3) to the filtrate collection chamber which is closed up to the top with the porous substrate (4). During vacuum filtration a membrane (8) made of 1D nanostructured material forms on the porous substrate (4). (1) indicates the suspension including the 1D nanostructured material. For pressure filtration illustrated in FIG. 4b a pump (7) is oriented above the level of the porous substrate (4). The straight arrows at the pumps indicate the flow of air.

FIG. 6 also shows a ceramic plate (104) located on the collector on which the fiber mat formed during electrospinning rests. The ceramic plate (104) can be later removed for further treatment of the fiber mat.

FIG. 8(a) shows a flat sheet membrane, FIG. 8b demonstrates the flexibility of the membrane obtained by the method of the present invention before calcination. FIGS. 8c and d show the membrane of the present invention after calcination in a stable cylindrical form thereby exemplifying in which form the membranes of the present invention can be casted.

FIGS. 12(a) and (b) show FESEM images of a $TiO_2$ nanowire membrane wherein the nanowires have been manufactured using hydrothermal synthesis. FIG. 12(a) is a FESM image at low magnification (scale bar 10 μm) and FIG. 12(b) is a FESM image at high magnification (scale bar 1 μm). From FIGS. 12(a) and 12(b), it can be seen that the $TiO_2$ nanowire membrane has been formed by overlapping and interpenetrating of long nanowires with typical lengths in the range of several micrometers to tens of micrometers. For more details see item 1.2 in the experimental section of the application.

FIGS. 13(a) and (b) show FESEM images of a $TiO_2$ nanofiber membrane fabricated from electrospinning of a nanofiber suspension. FIG. 13(a) is a FESEM image at low magnification (scale bar 1 μm) and FIG. 13(b) is a FESEM image at high magnification (scale bar 100 nm).

FIG. 15(a): the membrane surface without UV irradiation, FIG. 15(b): the membrane surface with UV irradiation, FIG. 15(c) the cross section without UV irradiation, FIG. 15(d) the cross section with UV irradiation. Scale bars are 3 μM for FIG. 15(a) and FIG. 15(b), and 10 μm for FIG. 15(c) and FIG. 15(d). It can be seen that in the absence of UV irradiation, a thick HA layer has been formed on the membrane surface (FIG. 15(a)) and less HA has been found inside of the membrane (FIG. 15(c)). It indicates that the $TiO_2$ nanowire membrane fouling is mainly attributed to the HA cake layer accumulated on the $TiO_2$ nanowire membrane surface. While, with concurrent UV irradiation during filtration, no HA cake layer has been found both on the membrane surface and inside of membrane pore. This evidence (FIGS. 15(b) and (d)) indicates that photocatalytic degradation occurred on the $TiO_2$ nanowire membrane and effectively eliminated the HA fouling.

FIG. 17 shows that the $TiO_2$ nanowire membrane shows satisfying photocatalytic activity, which is nearly the same as that of commercial P25 $TiO_2$. The TOC curves in FIG. 17 also indicate that similar mineralization rates between the $TiO_2$ nanowire membrane and P25 $TiO_2$ exist. The reduction of TOC in the solution indicates the mineralization of most HA into carbon dioxide and water. Compared with the photocatalytic degradation in the presence of either the $TiO_2$ nanowire membrane or P25 $TiO_2$, the degradation of HA by photolysis without $TiO_2$ photocatalyst has been much slower. For more details see the results under item 1.4 of the experimental section of the application.

FIG. 19 shows clearly that 57% of HA has been rejected using the $TiO_2$ nanowire membrane alone. With concurrent UV irradiation on $TiO_2$ nanowire membrane, the HA removal rate nearly reaches 100% owing to concurrent filtration and photocatalytic degradation. It also reveals that 93.6% of TOC have been removed by the $TiO_2$ nanowire membrane with concurrent UV irradiation. For more details see item 1.4 in the experimental section of this application.

FIG. 21(a) 4 L/min*m$^2$, FIG. 21(b) 8 L/min*m$^2$, FIG. 21(c) 12 L/min*m$^2$, and FIG. 21(d) 16 L/min*m$^2$. From the FIG. 21, it can be observed that the TMP gradually increased with the filtration time after 12 h of filtration at 16 L/min*m$^2$, which indicates increasing HA accumulate on membrane surface resulting in membrane fouling. In contrast, TMP remains constant at flux of 4, 8 and 12 L/min*m$^2$, indicating no membrane fouling occurs. For more details see item 1.4 in the experimental section of the application.

DETAILED DESCRIPTION OF THE PRESENT INVENTION

To provide membranes having improved physical properties such as mechanical strength and/or narrow pore size distribution, the present invention provides a method of fabricating a membrane made of a 1D nanostructured material, wherein the method comprises:
a. preparing a suspension comprising at least one or more than one 1D nanostructured material(s) and at least one surfactant;
b. filtering the suspension through a porous substrate; and
c. drying the membrane formed on the substrate.

Figure 1A:
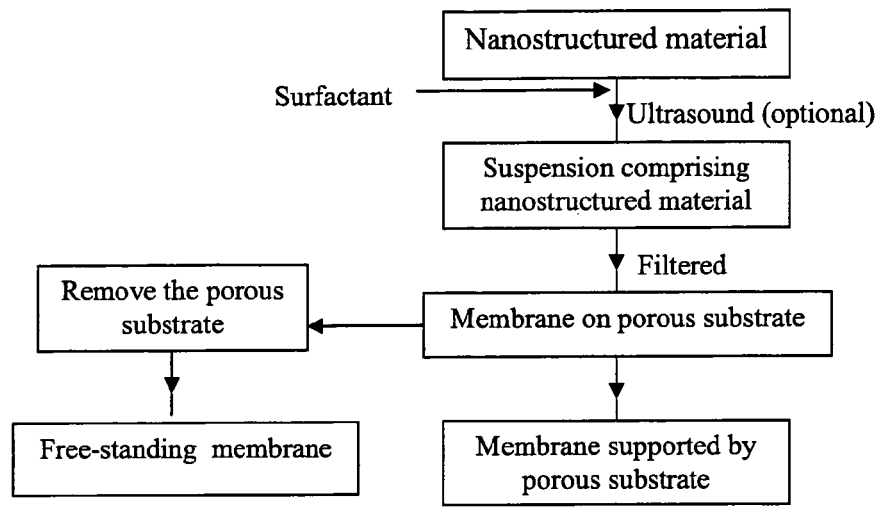
FIG. 1a shows a flowchart illustrating the method of the present invention. A 1D nanostructured material is dispersed and mixed with a surfactant. Afterwards the suspension is subjected to ultrasound for dispersion of the surfactant with the 1D nanostructured material. The resulting suspension is filtered to obtain the as-synthesized membrane of the present invention. Then the membrane is subjected to at least one drying step. Depending on the desired application, the membrane is calcined after the membrane has been detached from the porous support or while it is still located on the porous support.
Figure 8:
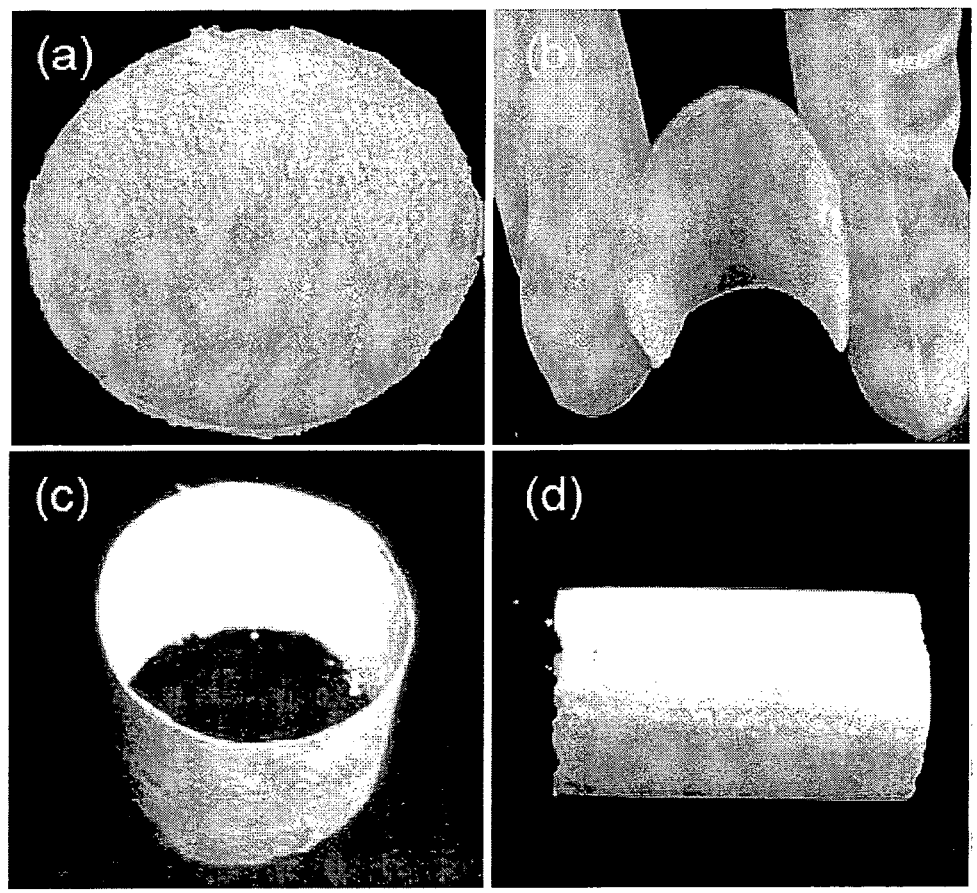
FIG. 8 shows further examples of $TiO_2$ membranes made of $TiO_2$ nanowires.

FIG. 1 provides a flowchart illustrating a method of the present invention. The surfactant used in the process of manufacturing the membrane of the present invention results in a uniform thickness and narrow pore size distribution of the membrane by avoiding aggregation of the 1D nanostructured material. The membrane thus obtained is a free-standing membrane meaning that it does not need any other support to be used or to stand in free space as illustrated by FIG. 8. It should be noted that this characteristic does not exclude the possibility that for certain applications the membrane is in contact to other surfaces or layer(s). However, such a contact is not solely necessary to provide mechanical support but for the purpose of the specific application. This characteristic is a difference between membranes known from the prior art which require a support, like for example the microfiltration membrane referred to in US 2006/0068668 A1 which is used to support the nanofiber membrane which has been formed. The method of the present invention can be used for all kinds of (1D) nanostructured materials having a high length to diameter aspect ratio because the membrane is formed by overlapping of the nanostructured material with each other. Thus, the method depends more on the form of the nanostructured material rather than the material it is made of.

To ensure a more uniform distribution of the 1D nanostructured material in the solution and to ensure a narrower pore size distribution, the method can further comprise the step of dispersing the suspension. A uniform dispersion can be achieved, for example, by using ultrasonic radiation. However, other means for ensuring a uniform dispersion can also be used. It is for example also possible to simply stir the solution using mechanical means like a magnetic stirrer. Another option is to rotate the flask in which the suspension is contained to ensure sufficient dispersion. The suspension should be dispersed for a time period that is sufficient to ensure a thorough mixing of the 1D nanostructured material in the suspension. In general this step should not last longer than 30 min. According to the accepted understanding of the person of average skill in the art, the term "suspension" is considered to refer to a mixture of two substances wherein one substance is in the solid phase (in this case the 1D nanostructured material) whiles the other one is in the liquid phase (surfactant+(solvent)).

The 1D nanostructured material is dissolved in an organic or aqueous "solvent" before it is mixed with the surfactant. It is also possible that the 1D nanostructured material and the surfactant are mixed at first and the solvent is added later. The choice of the solvent may depend on the kind of nanostructured material used. For example, some materials should not get into contact with water during their manufacture to a 1D nanostructured material (for example TiO$_2$ nanofiber which is electrospun). For such materials organic solvents such as ethanol, acetonitrile or acetone (to name only a few illustrative examples) are preferred. In other applications, e.g., water can be used as solvent (e.g. TiO$_2$ nanostructured material prepared using hydrothermal treatment). A person skilled in the art will know what kind of solvents can be used for the different materials which are already known in the art.

"Filtering the suspension through a porous substrate" separates the at least one 1D nanostructured material from the liquid in which it is suspended and results in formation of the membrane. In general, the term "filtration" refers to the separation of solid particles (here 1D nanostructured material) from a fluid-solid suspension of which they are part by passage of most of the fluid through a septum or membrane that retains most of the solids on or within itself. The membrane is called a filter medium (here the filter medium is the "porous substrate") and the equipment assembly that holds the filter medium and provides space for the accumulated solids is called a filter.

After the filtering step the membrane has been formed on the surface of the porous substrate. For the filtering step any porous substance can be used which is suitable to filter a suspension which includes a solid phase and a liquid phase. The porous substrate for filtration can, for example, comprise or consist of glass, ceramic, organic substances or mixtures thereof. In one illustrative example the substrate is made of ceramic or organic substances (such as paper). The substrate can have any structure as long as it allows filtering of the suspension through it. In general the porous substrate has a pore diameter of about 0.05 µm to about 2 µm. In one illustrative example a glass (SiO$_2$) filter having a pore diameter of about 0.45 µm can be used.

Figure 4A:
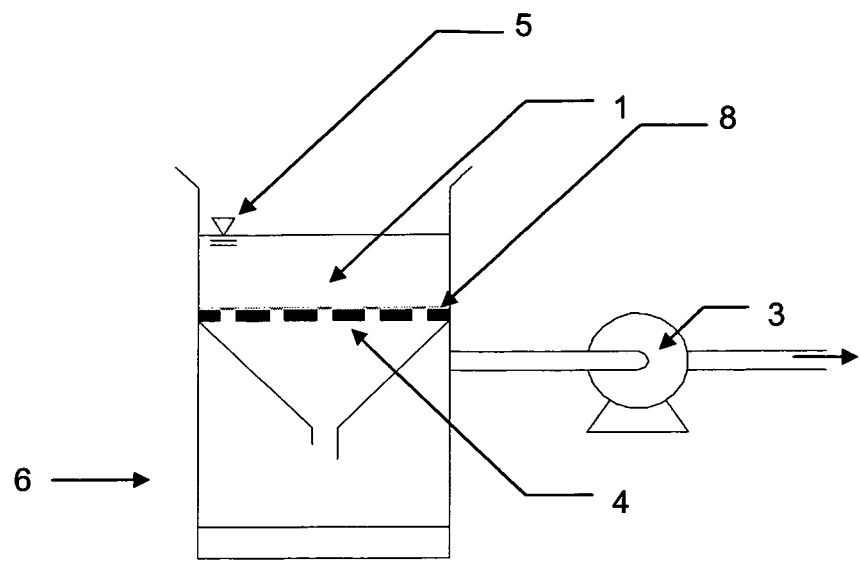
FIG. 4a and FIG. 4b illustrate the schematics of commercially available vacuum filtration equipment (6) and pressure filtration equipment (9) which can be used to manufacture the membrane of the present invention. (5) indicates the level of the suspension in the beaker. As more of the suspension is filtered as thicker the membrane becomes.
Figure 4B:
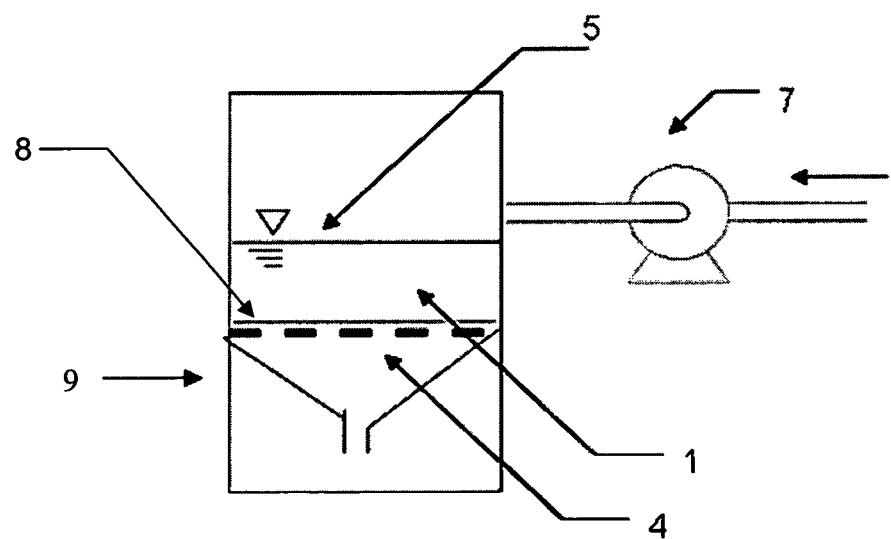

The filtration process which normally runs under gravitational force can be accelerated by applying a suction force or pressure to the membrane for example by carrying out the filtration using vacuum filtration or pressured filtration. A typical setup for vacuum filtration is illustrated in FIG. 4a. A vacuum pump (3) is used to provide suction force. A typical setup for pressured filtration is illustrated in FIG. 4b. A pump (7) is used to provide pressure for the membrane filtration. During filtration, suspension (1) passes through porous substrate (4) while 1D nanostructured materials are rejected and accumulated on the surface of the substrate (4) forming a membrane (8).

Carrying out a filtration for fabricating membrane has the further advantage that it allows formation of a uniform-thickness membrane on the porous substrate due to the nature of the filtration. This is because the transmembrane pressure (TMP) arising, e.g. from the gravity force, the pressure pump or vacuum applied is always stronger at the points where the membrane formed on the porous substrate is the thinnest compared to other points of the forming membrane. At these thinner points the TMP is stronger and more of the suspension is filtered through until the membrane is as thick as at the other points, i.e. the TMP at the previous thinner point is now again equally strong like at the other points of the membrane having the same thickness. This is a repeating process which ensures that the membrane thickness at the end of the process is very uniform over the whole area of the porous substrate. The pressure over the porous substrate which is induced by the pump or the vacuum is about 50 to 150 kPa or between about 60 to about 100 kPa. As it is obvious to a person skilled in the art, the pressure to be applied will depend on the kind of nanostructured material suspension which is filtered. For example, for nanostructured material having a smaller size (e.g. length), a higher pressure is needed because the pore size of the fabricated membrane is smaller. It should be noted that the vacuum filtration which can be applied for the filtering step has to be differentiated from the vacuum applied for drying (see further below).

The membrane can be dried while still being located on the porous substrate or it can be dried after removing it from the porous substrate. In another example, the drying step(s) is replaced or is followed by calcination of the membrane. Depending on the substrate the membrane is removed from the substrate before calcination or can be located on the substrate during calcination, which is carried out at much higher temperatures than drying, and can thus have the additional advantage that due to the high temperatures some porous substrates can be removed. This can be achieved for example by using calcination temperatures which are high enough so that a porous substrate melts or burns off (for example a paper filter which is burned off at high temperatures).

Furthermore, the porous substrate can have a shape which fits to a part or the whole of a structure in which form the membrane is supposed to be shaped. This can be achieved either by filtering the suspension through a porous substrate which lines the wall of a mold (in which case the mold should also be porous to allow filtering) or by providing a porous substrate which forms the mold itself. Thus, it is possible to use molds to bring the membrane directly into the shape in which the membrane is later supposed to be used (see FIG. 2(b)). Drying and/or calcination can take place while the membrane is still attached to the mold or after removing it from the mold.

In case membranes are manufactured which require calcination before reaching their final shape, the still flexible membrane can also be removed from the porous substrate after filtering (and optionally after a first drying step) and be put into a mold in which it is pressed into the final shape as indicated in FIG. 2 (b). After the subsequent calcination the membrane reaches its final shape as exemplarily indicated in FIG. 8.

Membranes of every dimension can be manufactured, i.e. form a few centimeters up to several meters. To achieve membrane dimensions which go beyond the size of the filtration apparatus, the membranes obtained can be add together so that they overlap. Subsequently, these joint membranes are pressed to form a larger membrane.

The thickness of the membranes manufactured according to the method of the present invention can be easily controlled by adjusting the concentration of the 1D nanostructured material in the suspension and/or adjusting the volume of the suspension which is filtered through the porous substance. In general membranes may have a thickness between about 100 nm to about 1 mm or between about 1 µm to about 500 µm. In one illustrative example disclosed in the experimental section a membrane having a thickness of about 10 µm has been manufactured.

The "drying" step or "thermal treatment" step for the membrane is carried out to remove the liquid and thus to obtain a stable membrane which does not need any further mechanical support to function. Depending on the 1D nanostructured material the membrane is made of, the drying step may comprise one or more different temperature treatments. The drying step can also be carried out by applying a vacuum to the membrane. It should be noted that applying a vacuum for the purpose of drying is not the same as applying a vacuum during the filtering step as has been explained in the previous paragraphs. Both vacuum filtration steps have a different function.

In one example, the drying step is carried out at a temperature between about room temperature (about 20° C. to about 25° C. depending on the location) to about 100° C. or 300° C. In any event, after drying the membrane does not require a mechanical support any longer. So the porous substrate can be removed from the membrane.

However, if it is useful, it is also possible to carry out further drying steps at different or the same temperature. In case the application requires it, it is also possible to keep the membrane attached to the substrate or another substrate after drying. This can be done, for example, to achieve a desired function of a multilayered membrane stack thus obtained. For example a $TiO_2$ membrane as described herein could be combined with another conventional electrode as novel electrode for electrical assisted photocatalysis.

The drying step can be replaced or followed by calcination (also referred to as calcining) of the membrane. In general, "calcination" means heating (a substance, in this case the membrane) to a high temperature but below the melting or fusing point, causing not only a loss of moisture but also a reduction or oxidation, the decomposition of carbonates and other compounds, or a phase transition of the substance other than melting. In case metals are subjected to calcination, it includes the conversion of the metal into its oxides as a result of heating to a high temperature. The crystal phase of nanostructured material is also formed during calcination.

Calcination is usually carried out for several hours, for example 1, 2, 3, 4, 5, 6 hours or even more. Calcination is normally carried out in furnaces or reactors (sometimes referred to as kilns) of various designs including shaft furnaces, rotary kilns, multiple hearth furnaces, and fluidized bed reactors.

In general, calcination is carried out at a temperature between about 300° C. to about 1000° C. or 400° C. to about 600° C. Calcination can also be carried out at a temperature of about 400° C. as well as at 500° C. These temperatures are only examples and a person skilled in the art will know that the temperature for calcination always depends on the kind of 1D nanostructured material which is used.

Different materials and/or structures of the material may require different temperatures for calcination. For example, in case it is desired to manufacture a membrane made of $TiO_2$ using the method of the present invention and the photocatalytic function of $TiO_2$ is required for the desired application; the $TiO_2$ nanostructured material should be in the rutile or anatase phase. In general, $TiO_2$ has three major crystal structures: rutile, anatase and brookite. However, only rutile and anatase play the role in the $TiO_2$ photocatalysis. Anatase phase is a stable phase of $TiO_2$ at low temperature (400-600° C.) and is an important crystalline phase of $TiO_2$. Rutile is a stable phase of $TiO_2$ at high temperature (600-1000° C.).

The structure of the 1D nanostructured material which the membrane is made of also influences the temperature for calcining. In case $TiO_2$ nanofibers (wires) are used as membrane material a temperature of about 600° C. can be used for calcination. In case TiO$_2$ nanotubes are used as membrane material a temperature of maximal about 450° C. should be used because the nanotube structure would otherwise collapse at higher temperatures. Other publications describing the effect of calcination on the structure and properties of nanostructured materials are the publications of Yu, J. G.; Yu, H. G.; et al., 2003, J. Phys. Chem. B, vol. 107, no. 50, p. 13871-13879 and Zhang, H.; Li, G. R.; et al., 2007, J. Phys. Chem. C, vol. 111, no. 16, p. 6143-6148.

The ramp rate with which the membrane is heated during calcination may, for example, be in the range of about 0.01° C./min up to about 5° C./min. A person skilled in the art will know that the ramp rate depends on the kind of nanostructured material. In general, a lower ramp rate results in better physical or chemical properties, like for example an improved crystal phase which can result in better photocatalytic activity in case photocatalytic materials, like TiO$_2$ are used. In case of TiO$_2$, the objective of calicination is to transfer amorphous TiO$_2$ into the anatase or rutile phase. A (s) lower ramp rate can form a more homogeneous crystal phase which results in higher photocatalytic activity. For example a ramp rate of 2° C./min can be used.

In case of TiO$_2$ the phase transformation might also be induced using the hydrothermal method as described by Hidalgo et al. (2007, Catalysis Today, vol. 129, p. 50-58). Using the hydrothermal method, the sample is placed in a Teflon® (polytetrafluoroethylene) recipient inside of a stainless steel autoclave. Hydrothermal treatment is performed at a low temperature, for example 120-150° C. for several hours up to 24 hours and at high working pressures, for example 198.48 (approx. 200) to 475.72 (approx. 480) kPa.

The concentration range of surfactants can be in between about 0.01 to about 1 wt. % based on the total weight of the resulting suspension. In one example of the present invention, the concentration of the surfactant is between about 0.1 to about 1 wt. %. In another example a concentration of the surfactant is between about 0.01 to about 0.2 wt %, for example a concentration of 0.02 wt %.

A "surfactant" as used herein is a member of the class of materials that, in small quantity, markedly affect the surface characteristics of a system; also known as surface-active agent. In a two-phase system, for example, liquid-liquid or solid-liquid, a surfactant tends to locate at the interface of the two phases, where it introduces a degree of continuity between the two different materials.

In general, surfactants are divided into four classes: amphoteric, with zwitterionic head groups; anionic, with negatively charged head groups; cationic, with positively charged head groups; and nonionic, with uncharged hydrophilic head groups. All of them can be used in the present invention. For the purposes of the present invention any kind of surfactant can be used.

Illustrative examples of an anionic surfactants include, but are not limited to, sodium dodecyl sulfate (SDS), sodium pentane sulfonate, dehydrocholic acid, glycolithocholic acid ethyl ester, ammonium lauryl sulfate and other alkyl sulfate salts, sodium laureth sulfate, alkyl benzene sulfonate, soaps or fatty acid salts.

Illustrative examples of nonionic surfactants include, but are not limited to, poloaxamers, alkyl poly(ethylene oxide), diethylene glycol monohexyl ether, copolymers of poly(ethylene oxide) and poly(propylene oxide), hexaethylene glycol monohexadecyl ether, alkyl polyglucosides (such as octyl glucoside, decyl maltoside), digitonin, ethylene glycol monodecyl ether, cocamide MEA, cocamide DEA, cocamide TEA or fatty alcohols (such as cetyl alcohoh, oleyl alcohol). In one illustrative example the poloaxamer used is F127.

Poloaxamers such as F127 are difunctional block copolymer surfactants terminating in primary hydroxyl groups. They are composed of a central hydrophobic chain of polyoxypropylene (poly(propylene oxide)) flanked by two hydrophilic chains of polyoxyethylene (poly(ethylene oxide)). Because the lengths of the polymer blocks can be customized, many different poloxamers exist having slightly different properties. For the generic term "poloxamer", these copolymers are commonly named with the letter "P" (for poloxamer) followed by three digits, the first two digits×100 give the approximate molecular mass of the polyoxypropylene core, and the last digit×10 gives the percentage polyoxyethylene content (e.g., P407=Poloxamer with a polyoxypropylene molecular mass of 4,000 g/mol and a 70% polyoxyethylene content). For the Pluronic tradename, coding of these copolymers starts with a letter to define it's physical form at room temperature (L=liquid, P=paste, F=flake (solid)) followed by two or three digits, the first digit(s) refer to the molecular mass of the polyoxypropylene core (determined from BASF's Pluronic grid) and the last digit×10 gives the percentage polyoxyethylene content (e.g., F127=Pluronic with a polyoxypropylene molecular mass of 4,000 g/mol and a 70% polyoxyethylene content). In the example given, poloxamer 407 (P407)=Pluronic F127.

Illustrative examples of cationic surfactant include, but are not limited to, cetyl trimethylammonium bromide (CTAB), dodecylethyldimethylammonium bromide, cetylpyridinium chloride (CPC), polyethoxylated tallow amine (POEA), hexadecyltrimethylammonium p-toluenesulfonate, benzalkonium chloride (BAC), or benzethonium chloride (BZT).

Examples for amphoteric surfactants include, but are not limited to, dodecyl betaine, sodium 2,3-dimercaptopropanesulfonate monohydrate, dodecyl dimethylamine oxide, cocamidopropyl betaine, 3-[N,N-dimethyl(3-palmitoylaminopropyl)ammonio]-propanesulfonate or coco ampho glycinate.

The surfactant ensures that the 1D nanostructured material in the suspension does not form aggregates which would lead to an uneven distribution in the later formed membrane. The 1D nanostructured material can be comprised in the suspension in a concentration of about 1 to 20 g/l. In one example the concentration is about 8 g/l.

As implied by the name the size of the 1D nanostructured material lies in at least one dimension in the nanometer range which means in a range of 200 nm to lower. For example, these 1D nanostructured materials can be very long in length while being very short in diameter or width (e.g. in a range of about 200 nm to 1 nm). The term "1D nanostructured material" is well known in the art and is used for material such as nanotubes and nanowires having dimensions in the nanoscale (Dong, W., Cogbill, A., et al. (2006, supra); Yuan, Z.-Y. and Su, B.-L., 2004, infra). Instead of "1D nanostructured material" the phrase "nanostructured material" can be used as well. Nanostructured materials are well known in the art. The material in the suspension which can be used in the method of the present invention include all kinds of 1D organic or inorganic nanostructured materials (e.g. TiO$_2$, ZnO, SiO$_2$, Al$_2$O$_3$, W$_2$O$_3$, etc), being, for example, in the form of fibers, wires, ribbons, hollow tubes, belts and mixtures thereof. Further materials which are suitable to manufacture such nanostructured materials are mentioned below.

A tube is understood to mean a hollow structure with a columniform shape. Fiber describes a solid structure with columniform shape. Ribbon or belt describes a solid structure with rectangular shape.

1D nanostructured materials are known in the art and are described, e.g., in A. Robert Armstrong, J. C. P. G. B., WO$_2$ Nanotubes and Nanowires. Angewandte Chemie International Edition 2004, 43, (37), p. 4899-4902; Campbell, R.; Bakker, M. G.; Havrilla, G.; Montoya, V.; Kenik, E. A.; Shamsuzzoha, M., Preparation of mesoporous silica templated metal nanowire films on foamed nickel substrates. Microporous and Mesoporous Materials 2006, 97, (1-3), p. 114-121; Chang Hyun, K.; Hye Jin, C.; Dae Sung, K.; Shin Young, K.; Jeunghee, P.; Je Yong, M.; Gangho, L.; Jungbum, Y.; Younghun, J.; Myung-Hwa, J.; Seung Il, J.; Cheol Jin, L., Magnetic anisotropy of vertically aligned alpha-$Fe_2O_3$ nanowire array. Applied Physics Letters 2006, 89, (22), 223103; Choi, K.; Cho, K.; Kim, K.; Nam, T.; Ahn, H.; Aim, J.; Kim, Y., Growth of $Ga_2O_3$ and GaP nanowires synthesized from mixed Ga/GaP powder as a precursor. Colloids and Surfaces A: Physicochemical and Engineering Aspects 2008, 313-314, 60-65; Elias, J.; Tena-Zaera, R.; Levy-Clement, C., Electrodeposition of ZnO nanowires with controlled dimensions for photovoltaic applications: Role of buffer layer. Thin Solid Films 2007, 515, (24), 8553-8557; Fan, S.; Chapline, M. G.; Franklin, N. R.; Tombler, T. W.; Cassell, A. M.; Dai, H., Self-Oriented Regular Arrays of Carbon Nanotubes and Their Field Emission Properties. Science 1999, 283, (5401), 512-514; Fei, X. L.; Tang, S. L.; Wang, R. L.; Su, H. L.; Du, Y. W., Fabrication and magnetic properties of Fe—Pd nanowire arrays. Solid State Communications 2007, 141, (1), 25-28; Hong, W.-K.; Kim, B.-J.; Kim, T.-W.; Jo, G.; Song, S.; Kwon, S.-S.; Yoon, A.; Stach, E. A.; Lee, T., Electrical properties of ZnO nanowire field effect transistors by surface passivation. Colloids and Surfaces A: Physicochemical and Engineering Aspects 2008, 313-314, 378-382; Jo, G.; Hong, W.-K.; Maeng, J.; Kim, T.-W.; Wang, G.; Yoon, A.; Kwon, S.-S.; Song, S.; Lee, T., Structural and electrical characterization of intrinsic n-type $In_2O_3$ nanowires. Colloids and Surfaces A: Physicochemical and Engineering Aspects 2008, 313-314, 308-311; Lin, S.-C.; Chen, S.-Y.; Chen, Y.-T.; Cheng, S.-Y., Electrochemical fabrication and magnetic properties of highly ordered silver-nickel core-shell nanowires. Journal of Alloys and Compounds 2008, 449, (1-2), 232-236; McCann, J. T.; Li, D.; Xia, Y., Electrospinning of nanofibers with core-sheath, hollow, or porous structures. Journal of Materials Chemistry 2005, 15, (7), 735-738; Musin, R. N.; Wang, X. Q., quantum size effect in core-shell structured silicon-germanium nanowires. Physical Review 2006, 74, (5), 165308; Nolan, M.; O'Callaghan, S.; Fagas, G.; Greer, J. C.; Frauenheim, T., Silicon Nanowire Band Gap Modification. Nano Lett. 2007, 7, (1), 34-38; Ren, S.; Bai, Y. F.; Chen, J.; Deng, S. Z.; Xu, N. S.; Wu, Q. B.; Yang, S., Catalyst-free synthesis of ZnO nanowire arrays on zinc substrate by low temperature thermal oxidation. Materials Letters 2007, 61, (3), 666-670; Routkevitch, D.; Bigioni, T.; Moskovits, M.; Xu, J. M., Electrochemical Fabrication of CdS Nanowire Arrays in Porous Anodic Aluminum Oxide Templates. J. Phys. Chem. 1996, 100, (33), 14037-14047; S. Huang, L. D. A. W. H. M., Controlled Fabrication of Large-Scale Aligned Carbon Nanofiber/Nanotube Patterns by Photolithography. Advanced Materials 2002, 14, (16), 1140-1143; Shi, Y.; Zhou, B.; Wu, P.; Wang, K.; Cai, C., Templated fabrication, characterization and electrocatalysis of cobalt hexacyanoferrate nanotubes. Journal of Electroanalytical Chemistry 2007, 611, (1-2), 1-9; vanVugt, L. K.; Ruhle, S.; Vanmaekelbergh, D., Phase-Correlated Nondirectional Laser Emission from the End Facets of a ZnO Nanowire. Nano Lett. 2006, 6, (12), 2707-2711; Wang, X.; Um, I. C.; Fang, D.; Okamoto, A.; Hsiao, B. S.; Chu, B., Formation of water-resistant hyaluronic acid nanofibers by blowing-assisted electro-spinning and non-toxic post treatments. Polymer 2005, 46, (13), 4853-4867; Wang, Y. D.; Zang, K. Y.; Chua, S. J.; Fonstad, C. G., Catalyst-free growth of uniform ZnO nanowire arrays on prepatterned substrate. Applied Physics Letters 2006, 89, (26); Wu, C.; Shi, J.-B.; Chen, C.-J.; Chen, Y.-C.; Lin, Y.-T.; Wu, P.-F.; Wei, S.-Y., Synthesis and optical properties of CuS nanowires fabricated by electrodeposition with anodic alumina membrane. Materials Letters 2008, 62, (6-7), 1074-1077; Xie, C.; Zhang, Z.; Wang, D.; Guan, G.; Gao, D.; Liu, J., Surface Molecular Self-Assembly Strategy for TNT Imprinting of Polymer Nanowire/Nanotube Arrays. Anal. Chem. 2006, 78, (24), 8339-8346; Yeong, K. S.; Thong, J. T. L., Field-emission properties of ultrathin 5 nm tungsten nanowire. Journal of Applied Physics 2006, 100, (11), 114325; Zhao, Y.; Jin, J.; Yang, X., Hydrothermal synthesis of titanate nanowire arrays. Materials Letters 2007, 61, (2), 384-388.

The article of Sigmund, W., Yuh, J., et al. (2006, J. Am. Ceram. Soc., vol. 89, no. 2, p. 395) describes, for example, (ceramic) nanofibers made of $NiFe_2O_4$, $Fe_3O_4$, $Pb(Zr_{0.52}Ti_{0.48})O_3$, $MgTiO_3$, $NiTiO_3$, $Al_2O_3$—$B_2O_3$, $CeO_2$, $ZrO_2$, $Al_2O_3$, $GeO_2$, $Mn_2O_3$—$Mn_3O_4$, $CO_3O_4$, $Nb_2O_5$, $TiO_2$, NiO/ZnO, PVP-$TiO_2$, $SnO_2$, $La_2CuO_4$, $SiO_2$ and $BaTiO_3$. Also described is the manufacture of core-sheath and hollow tubes made of PVP-$TiO_2$ as well as the manufacture of ribbons and coated nanofibers. In one example of coated nanofibers referred to in the article of Sigmund, W., Yuh, J., et al. (2006, supra) the coated nanofibers are made of $SiO_2$ which is coated with AlN. Such coated nanofibers can be used in space-based applications. Another group of nanostructured material described in the article of Sigmund, W., Yuh, J., et al. (2006, supra) are fibers made of ferroelectric materials like $BaTiO_3$ or $Pb(Zr, Ti)O_3$. Also described are magnetic nanofibers made of $NiFe_2O_4$ and $Fe_3O_4$. Examples of nanostructured material, in this case a nanotube, made of carbon is described in the article of Sumio Iijima (1991, Nature, vol. 354, p. 56).

In the article of Yuan, Z.-Y. and Su, B.-L. (2004, Colloids and Surfaces A: Physicochem. Eng. Aspects, vol. 241, p. 173) the manufacture of $TiO_2$ nanofibers, and nanoribbons is described. The specific nanostructure of the material such as a fiber, tube, ribbon etc. depends on the process parameter during their manufacture as already described in the article of Yuan, Z.-Y. and Su, B.-L. (2004, supra). Some examples of manufacturing nanofibers and nanotubes are described later on in the present application.

In the article of McCann, J. T., Li, D. and Xia, Y. (2005, J. Mater. Chem., vol. 15, p. 735) different applications of nanostructured materials are described. Depending on their specific properties, such materials and membranes formed thereof can be used in microfluidics, photonics, and energy storage. $La_2CuO_4$ for example is one of the potential materials for commercialization as nitrogen monoxide (NO) sensor while $TiO_2$ is an interesting material due to its photocatalytic properties (see further below). The membranes of the present invention can, for example, be used for filtering wastewater, filtering air, catalytically splitting water, cracking oil, making protection mask and armor, fabricating flame-retardant fabric, photo-assisted rewriting, sensing, controlled drug release or regenerating tissue. In one illustrative example of the present invention the use of a membrane manufactured according to the method of the present invention for cleaning/filtering wastewater is described.

In order to extend the utility of nanofibers selective modification and differentiation of the inner and outer surfaces may be desirable. A few examples have already been described above (see e.g. PVP-$TiO_2$). Derivatizing the surfaces of hollow nanostructured material with different functional groups changes the surface chemistry, thereby allowing tuning of properties such as fluid flow and allowing for the attachment of nanoparticles and other active compounds by chemical reaction with the derivative groups. It was for example demonstrated by Larsen, G., Velarde-Ortiz, R., et al. (2003, J. Am. Chem. Soc., vol. 125, p. 1154) that by using oil-soluble, long-chain silanes (with 18 carbons) the inner and outer surfaces of titania nanotubes can be selectively modified.

Membranes made of $TiO_2$ can, for example, be used for gas purification, water treatment, full cell and hydrogen production as described in Madaeni, S. S., 1999, The application of membrane technology for water disinfection, Water Research, vol. 33, no. 2, p. 301-308; Armor, J. N., 1998, Applications of catalytic inorganic membrane reactors to refinery products. Journal of Membrane Science, vol. 147, no. 2, p. 217-233; Smitha, B., Sridhar, S., et al., 2005, Solid polymer electrolyte membranes for fuel cell applications—a review, Journal of Membrane Science, vol. 259, no. 1-2, p. 10-26; Kerres, J. A., 2001, Development of ionomer membranes for fuel cells, Journal of Membrane Science, vol. 185, no. 1, p. 3-2'7; Koros, W. J., Fleming, G. K., 1993, Membrane-based gas separation, Journal of Membrane Science, vol. 83, no. 1, p. 1-80; Zaman, J., Chakma, A., 1994, Inorganic membrane reactors, Journal of Membrane Science, vol. 92, no. 1, p. 1-28.

Examples of multifunctional membranes made of nanostructured materials, like titanium oxide, manganese oxide, vanadium oxide or carbon nanotubes, are described for example in the article of Dong, W., Cogbill, A., et al. (2006, supra); Yuan, J., Laubernds, K., et al. (2004, Adv. Mater., vol. 16, p. 1729); Gu, G., Schmid, M., et al. (2003, Nature Mater., vol. 2, p. 316) and Endo, M., Muramatsu, H., et al. (2005, Nature, vol. 433, 476).

The 1D nanostructured material can comprise polymers, metal oxides, such as $TiO_2$, $SiO_2$, $ZnO_2$, $Al_2O_3$, $W_2O_3$ or mixtures thereof, or carbon, such as carbon nanotubes or nanofibers.

A large number of suitable polymers is known in the art. Illustrative examples include but are not limited to 1,1,1,3,3, 3-hexafluoroisopropanol (HFIP), poly(urethanes), poly(siloxanes), poly(silicones), poly(ethylene), poly(vinyl pyrrolidone), polyaniline/polyethylene oxide blends, poly(2-hydroxy ethyl methacrylate), poly(N-vinyl pyrrolidone), poly(methyl methacrylate), poly(vinyl alcohol) (PVA), poly (acrylic acid), poly(vinyl acetate), polyacrylamide, poly(ethylene-co-vinyl acetate), poly(ethylene glycol), poly(methacrylic acid), polylactic acid (PLA), polyglycolic acids (PGA), poly(lactide-co-glycolides) (PLGA), nylons, polyamides, polyanhydrides, poly(ethylene-co-vinyl alcohol) (EVOH), polycaprolactone, poly(vinyl acetate), polyvinylhydroxide, poly(ethylene oxide) (PEO) and polyorthoesters. It is also possible to use blends of different polymers listed above.

A polymer or polymer mixture used as material for manufacturing nanostructured material is most often electrospun into a 1D nanostructured material which can be used in the method of the present invention.

Other polymers which can be used include collagen, poly (alpha esters) such as poly(lactate acid), poly(glycolic acid), polyorthoesters, polyanhydrides and their copolymers. Further examples of polymers which can be used include cellulose ether, cellulose acetate, cellulose, cellulose ester, chitosan, gelatin, fluorinated polyethylene, poly-4-methylpentene, polyacrylonitrile, polyamide, polyamideimide, polyacrylate, polybenzoxazole, polycarbonate, polycyanoaryether, polyester, polyestercarbonate, polyether, polyetheretherketone, polyetherimide, polyetherketone, polyethersulfone, polyethylene, polyfluoroolefin, polyimide, polyolefin, polyoxadiazole, polyphenylene oxide, polyphenylene sulfide, polypropylene, polystyrene, polysulfide, polysulfone, polytetrafluoroethylene, polythioether, polytriazole, polyurethane, polyvinyl, polyvinylidene fluoride, regenerated cellulose, silicone, urea-formaldehyde, or copolymers or physical blends of these materials. The material may be impregnated with suitable antimicrobial agents.

When the 1D nanostructured material is a polymer which is manufactured via electrospinning, it may sometimes be necessary to dissolve the polymer or the mixture of polymers before it can be used for electrospinning. For this purpose the at least one polymer can be dissolved in an inorganic solvent or an organic solvent. Exemplary solvents which can be used, include, but are not limited to acetone, N,N-dimethylformamide (DMF), water/chloroform, water, methylethylketone, silk aqueous solution, acetic acid, formic acid, ethanol, diethylformamide, methylene chloride together with dimethyl formamide, dimethyl formamide:toluene (1:9), water/ethanol or NaCl, hydrochloric acid, camphorsulfonic acid, dichloromethane mixed with trifluoroacetic acid, chloroform, dimethylacetamide, dimethyl formamide:tetrahydrofuran (1:1), dichloromethane, tetrahydrofuran (THF), N,N-dimethyl acetamide (DMAc), 1,1,1,3,3,3-hexa fluoro-2-propanol (HFIP), HFIP mixed with DMF, isopropyl alcohol (IPA), sulphuric acid, and mixtures thereof.

In Table 1 of a review article of Huang, Z.-M., Kotaki, M. and Ramakrishna, S. (2003, Composites Science and Technology, vol. 63, p. 2223-2253) at page 2226-2230, a list of polymers together with a suitable solvent is given. Another example is the list referred to in the article of Subbiah, T. and Bhat, G. S. et al. (2005, Journal of Applied Polymer Science, vol. 96, p. 557-569). These articles and in particular the content of Table I is incorporated by reference into the present application. It should be noted that these lists illustrate only exemplary combinations of polymers and solvents and that a person skilled in the art knows how to create further or different combinations than the one mentioned in these articles.

Further examples of polymers which are suitable for the manufacture of 1D nanostructured material are described in the articles of Casper, C. L., J. S. Stephens, et al. 2004, Macromolecules, vol. 37, no. 2, p. 5'73; Gopal, R., Kaur, S., et al., 2007, Journal of Membrane Science, vol. 289, no. 1-2, p. 210; Jarusuwannapoom, T., Hongrojjanawiwat, W., et al., 2005, European Polymer Journal, vol. 41, no. 3, p. 409; Liu, H. and Hsieh, Y. L., 2002, Journal of Polymer Science, Part B: Polymer Physics, vol. 40, no. 18, p. 2119; Lyons, J. and Ko, F., 2005, Polymer News, vol. 30, no. 6, p. 170; Norris, I. D., Shaker, M. M., et al., 2000, Synthetic Metals, vol. 114, no. 2, p. 109-114; Reneker, D. H. and Chun, I., 1996, Nanotechnology, vol. 7, no. 3, p. 216; Theron, S. A., Zussman, E., et al., 2004, Polymer, vol. 45, no. 6, p. 2017; Yarin, A. L., Koombhongse, S., et al., 2001, Journal of Applied Physics, vol. 90, no. 9, p. 4836; Yuan, X. Y., Zhang, Y. Y., et al., 2004, Polymer International, vol. 53, no. 11, p. 1704; Zheng, J., He, A. et al., 2006, Polymer, vol. 47, no. 20, p. 7095.

Illustrative examples of organic solvents for dissolving polymers for electrospinning include, but are not limited to, acetone, N,N-dimethylformamide (DMF), diethylformamide, chloroform, methylethylketone, acetic acid, formic acid, ethanol, 1,1,1,3,3,3-hexa fluoro-2-propanol (HFIP), tetrafluoroethanol, dichloromethane (DCM), tetrahydrofuran (THF), trifluoroacetic acid (TFA), camphorsulfonic acid, dimethylacetamide, isopropyl alcohol (IPA) and mixtures thereof. Examples of mixtures are DCM with DMF, DMF: Toluene (1:9), ethanol/NaCl, DCM mixed with TFA, DMF: THF (1:1) and HFIP mixed with DMF.

Illustrative examples of inorganic solvents for dissolving polymers for electrospinning include, but are not limited to water, hydrochloric acid, sulphuric acid and mixtures thereof. Illustrative Examples of mixtures of inorganic solvents include water/NaCl and water/chloroform.

For some applications it might be of some advantage not to use solvents. In these cases polymer melts can be used alternatively. For example, polymers, such as poly(lactic acid) (PLA), polyethylene (PE), polypropylene (PP), nylon 12 together with PA-12, polyethylene terephthalate (PET), polyethylene naphthalate (PEN), polyethylene terephthalate together with polyethylene naphthalate, and polycaprolactone together with poly(ethylene oxide-block-ε-caprolactone) (PEO-b-PCL) can be used in melted forms.

Polymer melts are known to a person skilled in the art and are described, for example, in the article of Huang, Z.-M., Kotaki, M. and Ramakrishna, S. (2003, Composites Science and Technology, vol. 63, p. 2223-2253), Table II and Dalton, P. D., Klinkhammer, K. et al. (2006, Biomacromolecules, vol. 7, no. 3, p. 686-690).

In another example, such nanostructured material can comprise photocatalytic material or can comprise/consist of $TiO_2$ nanotubes, $TiO_2$ nanofibers or mixtures thereof. Other examples of photocatalytic materials are described in the article of Hoffmann, M. R., Martin, S. T., et al. (1995, Chem. Rev., vol. 95, p. 69). Further examples of photocatalysts next to the biologically and chemically inert $TiO_2$ would be $WO_3$, $SrTiO_3$, α-$Fe_2O_3$, ZnO, ZnS or mixtures thereof. The article of Liu, Z.; Sun, D. D.; Guo, P.; Leckie, J. O. (An Efficient Bicomponent $TiO_2$/$SnO_2$ Nanofiber Photocatalyst Fabricated by Electrospinning with a Side-by-Side Dual Spinneret Method. Nano Lett. 2007, 7, (4), p. 1081-1085) describes for example a $TiO_2$/$SnO_2$ composite material.

Most of the aforementioned materials except the polymers can be classified as ceramics. The method of the present invention thus allows the manufacturing of ceramic membranes made of 1D nanostructured material. The classes of materials generally considered to be ceramics are oxides, nitrides, borides, carbides, silicides, and sulfides. Intermetallic compounds such as aluminides and beryllides are also considered ceramics, as are phosphides, antimonides and arsenides. Ceramics are tailored to have premium properties through application of advanced materials science and technology to control composition and internal structure.

As previously mentioned, the structure of the 1D nanostructured materials usually depends on its manufacturing process parameters. Ceramics can thus also be manufactured in nanostructured form, like fibers, tubes (hollow or solid) or wires. Examples referred to in the present application are the manufacture of $TiO_2$ ceramic nanofibers and nanotubes.

Those 1D nanostructured materials can be manufactured using any method known in the art. Nanotubes have for example been manufactured from layered structures as described by Iijima S. (1991, supra) and Tenne, R. (2002, Chem. Eur. J., vol. 8, no. 23, p. 5297). Those nanotubes have been produced using an arc-discharge evaporation method similar to that used for fullerene synthesis; the needles grow at the negative end of the electrode used for the arc discharge. Another option comprises self-assembly methods as described for organic materials by Bong, T. D., Clark, T. D. et al. (2001, Angew. Chem. Int. Ed., vol 40, p. 988). Template methods for the production of polymer, metal, and hybrid nano- and mesotubes are described for example in the article of Bognitzki M., Hou, H., et al. (2000, Adv. Mater., vol. 12, no. 9, p. 637). The general concept referred to by Bognitzki M., Hou, H., et al. (2000, supra) is to take such extremely thin degradable template polymer fibers, and to coat them with the desired wall materials using various types of deposition techniques. Tubes are subsequently formed via selective removal of the core material, exploiting, for instance, the thermal degradation of the template fibers.

Other methods of preparing 1D nanostructured materials include the hydrothermal method or hydrothermal synthesis (Hidalgo et al., 2007, supra; Yuan, Z.-Y., Su, B.-L., 2004, Colloids and Surfaces A: Physicochem. Eng. Aspects, vol. 241, p. 173; Byrappa K. and Yoshimura, M., 2001, Handbook of Hydrothermal Technology, ISBN 978-0-8155-1445-9) and electrospinning (McCann, J. T., Li, D. and Xia, Y., 2005, supra; Sigmund, W., Yuh, J., et al., 2006, supra; Bender, E. T., Katta, P., et al., 2006, Surf. Interface Anal., vol. 38, p. 1252; Madhugiri, S., Sun, B., et al., 2004, Microporous and Mesoporous Materials, vol. 69, p. 77; Subbiah, T. and Bhat, G. S. et al., 2005, Journal of Applied Polymer Science, vol. 96, p. 557).

Unlike other methods for generating 1D nanostructures, the formation of a thin fiber for a scaffold via 'electrospinning' as already mentioned previously is based on the uniaxial stretching (or elongation) of a viscoelastic jet derived from a polymer solution or melt. This technique is similar to the commercial processes for drawing microscale fibers except for the use of electrostatic repulsions between surface charges (rather than a mechanical or shear force) to continuously reduce the diameter of a viscoelastic jet or a glassy filament. Compared with mechanical drawing, electrostatic spinning is better suited for generating fibers with much thinner diameters, since the elongation can be accomplished via a contactless scheme through the application of an external electric field. Like mechanical drawing, electrospinning is also a continuous process and therefore should work well for high-volume production (Li, D. & Xia, Y. N., 2004, Advanced Materials, vol. 16, p. 1151-1170).

In electrospinning, a fiber is generated as the electrified jet (composed of a highly viscous polymer solution, see further below) is continuously stretched due to the electrostatic repulsions between the surface charges and the evaporation of solvent. As the fiber travels toward the surface of the collector (conductive plate 105), evaporation of the solvent in which the polymer or nanostructured material/precursor is dissolved occurs and the fiber is typically dry when arriving at the surface of the collector (conductive plate 105) (see FIG. 6). To carry out this method, a syringe pump 101 is used which squeezes a small amount of a complex fluid (nanostructured material, solvent, polymer or ceramic precursor) out of a needle 102 which has a diameter of up to 100 μm. In one example a 23 gauge needle is used. The metallic needle 102 is attached to a high voltage source 103 either positive or negative (producing a high voltage between about 1 to 50 kV). The droplet that forms at the end of the needle 102 will change its form as soon as a voltage is applied. In addition to the surface tension and gravity force now additional forces shape a cone (the so called 'Taylor cone'). Depending on the experimental conditions the jet then starts to whip close to the collector 105 that causes it to thin to a few hundred nanometers with lower limits in the tenths of nanometers.

The complex fluid containing nanostructured material or ceramic precursor can consist of salt loaded polymer solutions, sol-gel systems, or nanoparticle slurries.

For example, precursor materials for the manufacture of 1D nanostructured materials comprising $TiO_2$ can be metallic alkoxides or organometallic precursors. Examples of titanium alkoxides can include, but are not limited to titanium methoxide, titanium ethoxide, titanium isopropoxide, titanium propoxide and titanium butoxide.

Such precursors can be supplemented with compositions which increase their viscosity to ensure that during electrospinning a fiber or tube is electrospun and not spherical nanoparticles. Such compositions which enhance the viscosity are known in the art of electrospinning. For example when $TiO_2$ is used polymer solutions such as polyvinylpyrrolidone (PVP) can be used to increase the viscosity.

Furthermore, the precursors can be treated to reduce the rate of hydrolysis, e.g., by ligand exchange. In case of $TiO_2$ acetic acid or acetylacetonate is used to reduce the rate of hydrolysis by ligand exchange of the acetate group with the alkyl group of the respective alkoxide.

By using a coaxial spinneret (needle) 102 core-sheath and hollow nanostructured materials have been synthesized (McCann, J. T., Li, D. and Xia, Y., 2005, supra). Using electrospinning nanostructured materials with diameters ranging from 20 nm to 1 µm can be produced.

Electrospinning has been shown in the art to be suitable to produce non-woven fiber mats and has also been shown to produce nanostructured forms like, fibers, ribbons as well as filled and hollow tubes Sigmund, W., Yuh, J., et al. (2006, supra).

Another well known method which can be used for the manufacture of nanostructured material is the hydrothermal method. An overview over this technique of crystallizing substances is provided by Byrappa K. and Yoshimura, M. (2001, supra). In brief, the hydrothermal method includes various techniques of crystallizing materials from high-temperature aqueous solutions at high vapor pressures. The crystal growth is performed in an apparatus consisting of a steel pressure vessel called autoclave or bomb in which a nutrient (including the material which is supposed to crystallize) is supplied along with water or another solvent. A temperature gradient is maintained at the opposite ends of the vessel so that the hotter end dissolves the nutrient and the cooler end causes crystals to grow on the seeds provided in the vessel.

A large number of materials can been synthesized under hydrothermal conditions: elements, simple and complex oxides, tungstates, molybdates, carbonates, silicates, germanates etc. For example, in the article of Gogotsi, Y., Joseph, A., et al. (2000, Journal of Materials Research, vol. 15, no. 12, p. 2591) the manufacture of open end and closed multiwall carbon nanotubes using hydrothermal method is described. The articles of Hidalgo et al. (2007, supra) and Kolen'ko, Y. V., Churagulov, B. R., et al. (2004, Appl. Cata. B: Environ., vol. 54, p. 51) described the manufacture of nanostructured material made of titanium powder.

A 1D nanostructured material of particular general interest is $TiO_2$. Nanosized titanium dioxide ($TiO_2$) particles are a popular photocatalyst which attract much attention from both a fundamental research perspective and the practical application of removing contaminants from water (Hoffmann, M. R., Martin, S. T., et al., 1995, supra; Fujishima, A., Rao, T. N., et al., 2000, J. Photochem. Photobio. C, vol. 1, p. 1). The evidence of photoelectrochemical splitting of $H_2O$ over $TiO_2$ has initiated a great deal of research activity in the field of photocatalytic activity of $TiO_2$. Photocatalysis with titania has many advantages, e.g., for the wastewater treatment, such as a high catalysis efficiency, an energy-saving and an absence of pollution. Hence, this process can photodegrade all kinds of organic pollutants in water.

As previously mentioned, $TiO_2$ in the rutile and anatase phase shows the best photocatalytic activity reported so far. Both the phases are semiconductors with a bandgap of 3.23 eV for anatase and 3.10 eV for rutile. Under UV light illumination, absorption of photons creates an electron-hole pair if the energy is higher than the bandgap. The pairs migrate at the surface, are trapped by the titanium and OH surface groups, and finally from $OH^{\cdot}$ and $HO_2^{\cdot}$ radicals. These free radicals cause the oxidation of organic compounds like phenol (Kolen'ko, Y. V., Churagulov, B. R., et al., 2004, supra).

However, nanosized $TiO_2$ photocatalyst has an inherent and significant drawback, that is, separation and recovery (Li, X. Z., Liu, H., et al., 2003, Environ. Sci. Technol., vol. 37, p. 3989; Zhang, X., Wang, Y., et al., 2005, J. Mol. Catal. A: Chem., vol. 237, p. 199). In order to increase the photocatalytic activity of $TiO_2$ and concurrently solve the problem of separation and recovery, it is important to re-design $TiO_2$ structured photocatalytic material as a photocatalyst.

A $TiO_2$ membrane provides a beneficial solution to this drawback because no extra separation is needed, as it provides unique multifunctional concurrent separation and photocatalytic degradation. Many research studies have been carried out to fabricate $TiO_2$ membranes by coating $TiO_2$ films on various supports (Molinari, R., Palmisano, L., et al., 2002, J. Membr. Sci, vol. 206, p. 399; Van Gestel, T., Vandecasteele, C., et al., 2002, J. Membr. Sci., vol. 207, p. 73). Unfortunately, photocatalytic efficiency of these coated $TiO_2$ membranes on supports was lower than that of nanosized $TiO_2$ photocatalysts alone.

However, a $TiO_2$ membrane manufactured using the method of the present invention provides a membrane which can be used for photocatalytic applications such as cleaning wastewater, and which does not require any mechanical support. Therefore, a membrane has been manufactured by the inventors, which is made of 1D nanostructured $TiO_2$ providing not only a narrow pore size distribution and uniform thickness but also provides a highly flexible and stable freestanding membrane. In addition, this $TiO_2$ material shows excellent photocatalytic activity.

For the manufacture of such a $TiO_2$ membrane 1D nanostructured $TiO_2$ is used as starting material. As previously mentioned, manufacturing of 1D nanostructured material is well known in the art. The manufacture of 1D nanostructured $TiO_2$, including nanofibers nanowires, nanorods and nanotubes, which have been synthesized by chemical or physical methods is also known from the prior art (Liu, Z.; Sun, D. D., et al. 2007, supra; Tsai, C. C., Teng, H., 2006, Chem. Mater., vol. 18, no. 2, p. 367-3'73; Daoud, W. A.; Pang, G. K. H., 2006, J. Phys. Chem. B, vol. 110, no. 51, p. 25'746-25750; Pavasupree, S., Suzuki, Y., et al. 2005, J. Solid State Chem., vol. 178, no. 10, p. 3110-3116; Armstrong, A. R., Canales, G. A. J. and Bruce, P. G., 2004, infra; Jung, J. H., Kobayashi, H., et al., 2002, Chem. Mater., vol. 14, p. 1445 ($TiO_2$ doublelayered nanotubes and $TiO_2$ ribbons); Yao, B. D., Chan, Y. F., et al., 2003, Appl. Phys. Lett., vol. 82, p. 281; Kasuga, T., Hiramatsu, M., et al., 1998, Langmuir, vol. 14, p. 3160; Tian, Z. R., Voigt, J. A., et al., 2003, J. Am. Chem. Soc., vol. 125, p. 12384; Yoshida, R., Suzuki, Y., Yoshikawa, S., 2005, J. Solid State Chem., vol. 178, p. 2179 ($TiO_2$ nanowires); Yuan, Z.-Y., Su, B.-L., 2004, Colloids Surf, A, vol. 241, p. 173 ($TiO_2$ nanowires, tubes and fibers); Chen, Y., Crittenden, J. C., et al., 2005, Environ. Sci. Technol., vol. 39, p. 1201 ($TiO_2$ nanotubes)).

Among the methods of manufacturing nanostructured $TiO_2$ the hydrothermal method is one of the methods, which is used widely due to its easy operation. For example, $TiO_2$ nanowires can be obtained by treating $TiO_2$ powders (such as P25 from Degussa) within steel pressure vessels autoclave under controlled temperature and/or pressure in strong basic NaOH solution. It is well accepted that during hydrothermal reaction, some of the Ti—O—Ti bonds are broken and Ti—O—Na and Ti—OH bonds are formed, which results in the formation of $TiO_2$ nanowires (Yoshida, R., Suzuki, Y., Yoshikawa, S., 2005, supra; Chen, X., Mao, S. S., 2007, Chem. Rev., vol. 107, p. 2891). These $TiO_2$ nanowires itself already exhibit a good photocatalytic efficiency relative to conventional bulk materials as a result of its larger surface area and presence of quantum size effect. The manufacture of $TiO_2$ nanofibers using electrospinning is described in the present application.

Figure 1B:
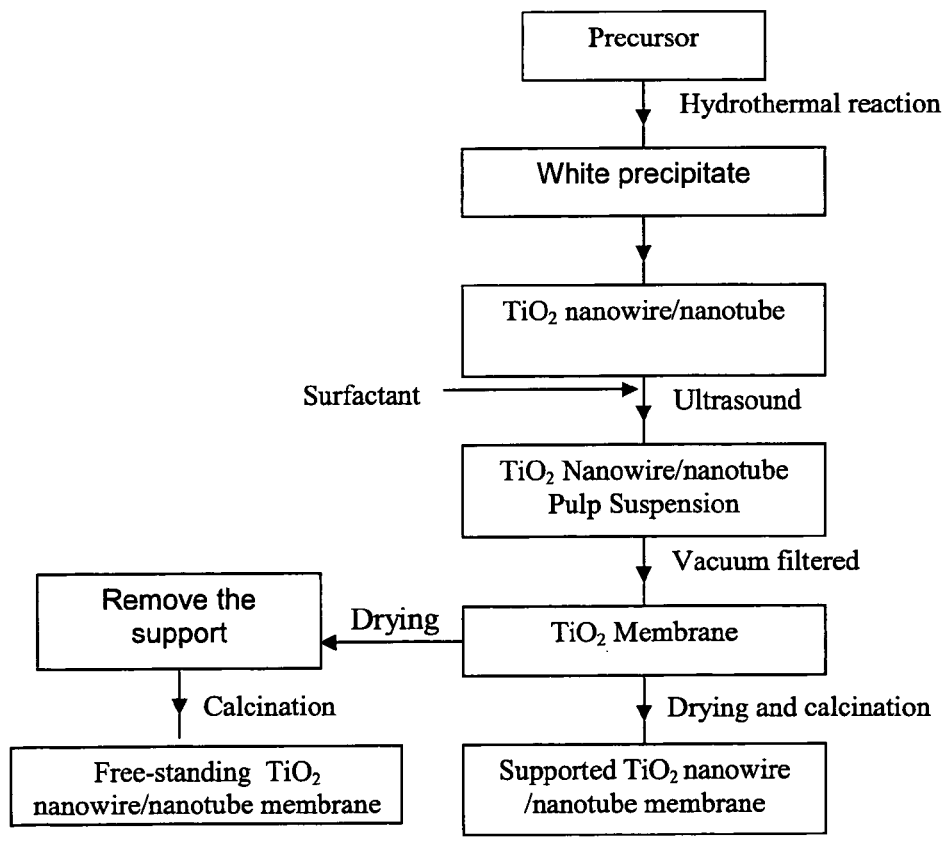
FIG. 1b illustrates one example of manufacturing a membrane of the present invention.

The flowcharts illustrated in FIGS. 1(b) to 3 show different examples of how to obtain a membrane according to the present invention. In FIG. 1(b) the 1D nanostructured materials used are $TiO_2$ nanowires or nanotubes which have been manufactured using hydrothermal reaction referred to above. It should be noted that the hydrothermal synthesis can also be used to manufacture $TiO_2$ material having another structure, like ribbon, band etc. The $TiO_2$ nanowires or nanotubes obtained from the hydrothermal reaction as white precipitate are mixed with a surfactant before being dispersed in water using ultrasound. The resulting $TiO_2$ nanowire or nanotube pulp suspension is then filtered to obtain the membrane. Filtration is accelerated by using pressured or vacuum filtration. Subsequently there are two different options how to proceed after drying the as-synthesized membrane which is still located on the porous substrate. Either the $TiO_2$ membrane is calcinated while still being connected to the porous substrate or the membrane is removed and then calcinated as indicated in FIG. 1(b).

Figure 2A:
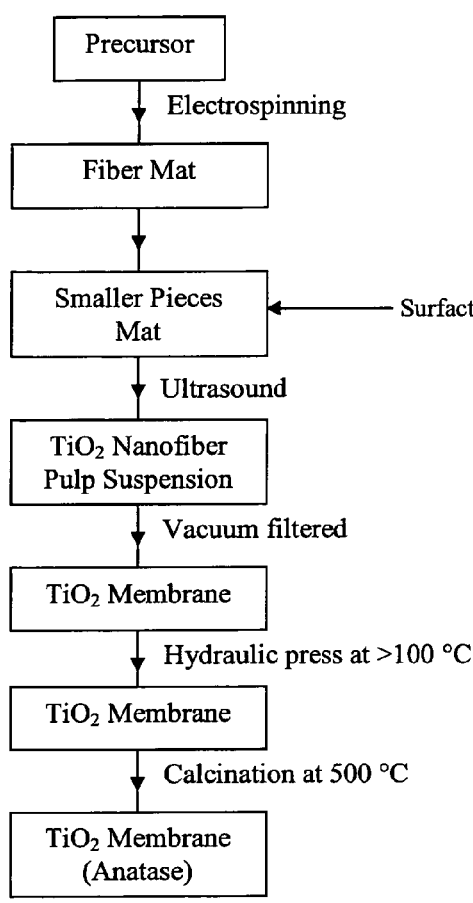
FIG. 2a and FIG. 2b illustrate other possibilities of manufacturing a membrane of the present invention.
Figure 2B:
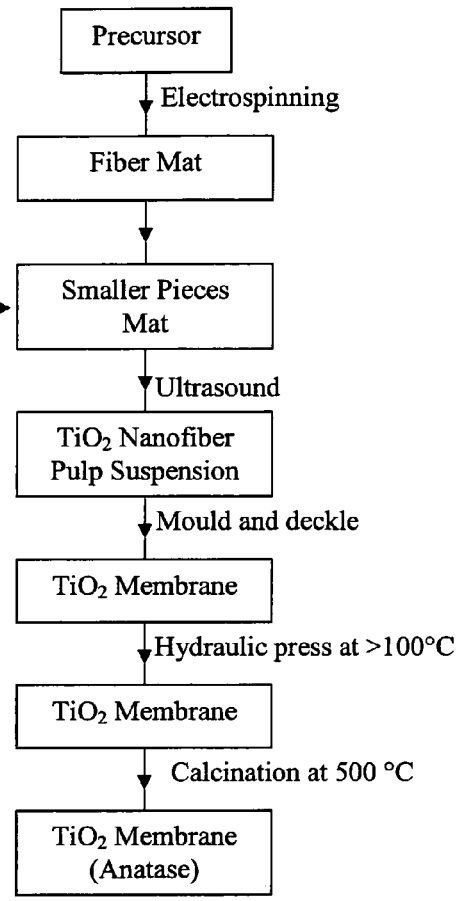

FIGS. 2(a) and (b) refer to examples in which the nanostructured $TiO_2$ material has been obtained using electrospinning instead of hydrothermal synthesis. The fiber mat which forms on the collector of the electrospinning apparatus is crashed into smaller pieces. With small it is meant any size smaller than the size of the original fiber mat. The nanostructure of the $TiO_2$ material remains even when the fiber mats are crashed into smaller pieces. These smaller pieces are dissolved in a solvent, such as acetone or acetonitrile, and a surfactant is added. To disperse the solution of nanostructured $TiO_2$ and surfactant ultrasound is applied. Afterwards, the pulp suspension obtained is filtered using vacuum filtration (see e.g. FIG. 4). The suspension thus obtained is then filtered using vacuum filtration described above (FIG. 2(a)) or is filled in a mould and deckle (FIG. 2(b)). Mould and deckle are used when one wishes to process larger pieces of membrane when a laboratory filtration apparatus may not be adequate. The $TiO_2$ membrane obtained after filtering is then pressed into the desired final form using a hydraulic press at >100° C. This compression has the additional positive effect that the $TiO_2$ membrane obtained is in a more compact form which increases the likelihood of the fibers to fuse with each other during calcination. Compression of the membrane, e.g. by use of a hydraulic press, can be carried out irrespective of the method with which the 1D nanostructured material and subsequently the membrane have been manufactured. This method can also be used for other materials than $TiO_2$.

As last step in the chain of temperature treatments the pressed membrane is calcined at about 500° C. to transfer $TiO_2$ into its photocatalytic more active anatase state.

Figure 3:
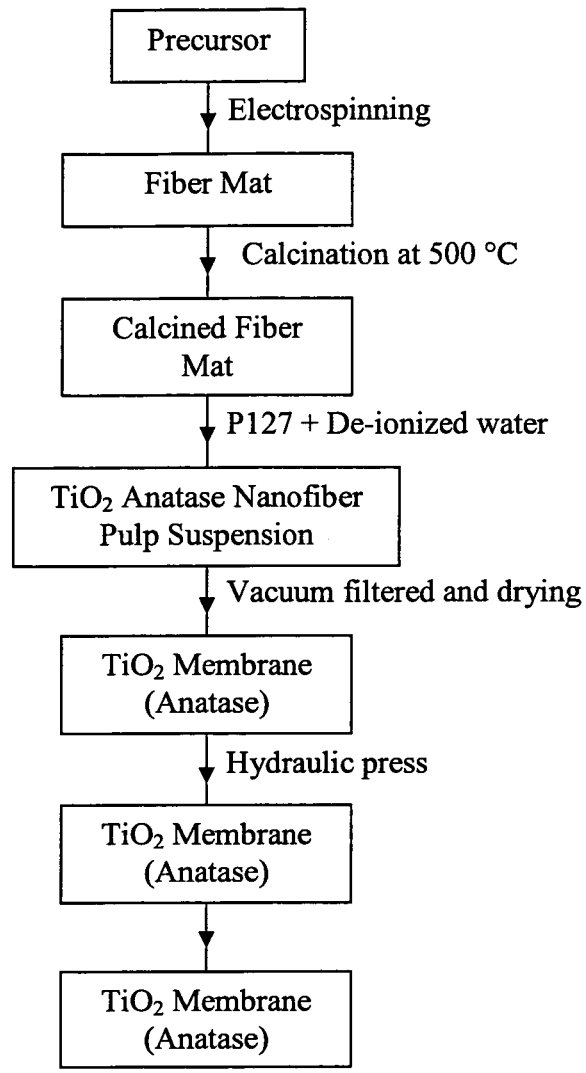
FIG. 3 illustrates another way of manufacturing a membrane of the present invention.

In FIG. 3 another example is illustrated in which electrospun $TiO_2$ has been used for manufacturing a membrane. Other than in FIG. 2(a), the electrospun $TiO_2$ is calcined already before it is broken into smaller pieces which are subsequently dissolved and mixed with a surfactant. Thus, the thermal treatment is already carried out before the membrane is formed according to the method of the present invention. Calcining the fiber mat before dissolving it in a surfactant is carried out, for example, to burn away any polymer solution, such as the above mentioned PVP which is used together with the $TiO_2$ precursor material, prior to forming the membrane. Otherwise with the formation of membrane followed by calcination, the final membrane may shrink in size. A significant amount of the mixture of precursor and polymer might be taken up by the polymer.

Figure 7:
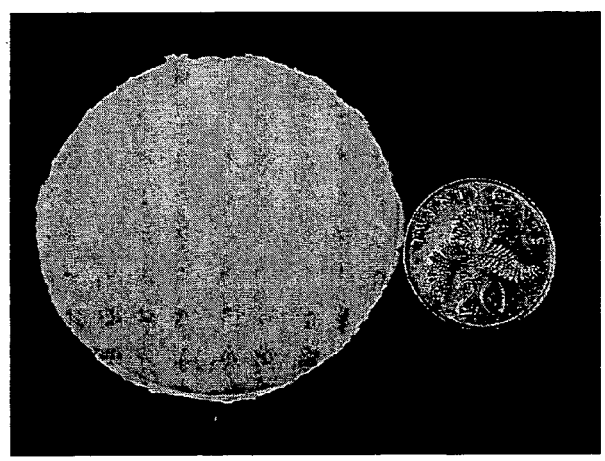
FIG. 7 shows an image of a $TiO_2$ membrane (coin and membrane are shown in its original size) obtained by the method of the present invention. The membrane shown in FIG. 7 is made of nanowires manufactured by hydrothermal synthesis. For more details regarding the method of manufacture of this membrane see item 1 in the experimental section of the application.

As illustrated by FIGS. 1(b) to 3, membranes comprised of 1D nanostructured material can be obtained following different routes. The efficiency of membranes obtained with the method of the present invention will be exemplarily demonstrated based on $TiO_2$ membranes (FIG. 7). One of the important advantages/features of the membranes obtained by the method of the present invention is their flexibility and the fact that they do not require any further support in order to function and/or are free standing. FIG. 8(b) demonstrates the flexibility of the membrane obtained directly after filtering and removal from the substrate while FIGS. 8(c) and (d) show the final shape of such a membrane after calcination.

Membranes made of $TiO_2$ have as an advantage that $TiO_2$ is a photocatalyst which is of high interest for the industry. $TiO_2$ is used as advanced material for the manufacture of micro/ultra filtration (MF/UF) membranes for advanced water treatment processes for producing high quality drinking water with small footprint. The traditional filtration membranes have the disadvantage that they have a tendency to foul. This membrane fouling is caused by deposition of contaminants such as natural organic matters (NOMs), which is one of the major problems in using filtration membranes for producing high quality drinking water (Yuan, W., Zydney, A. L., 1999, J. Membr. Sci., vol. 157, p. 1). These NOMs have also been shown to react with the major disinfectants (chlorine, ozone, chlorine dioxide, chloramines) to produce a host of disinfection by-products (DBPs).

Membrane fouling and gel formation on filtration membranes causes a decline of permeate flux. In general, the membrane fouling can be defined as the accumulation of contaminated compounds on the surface and the pores of a membrane which form a solid layer. The solid layer on the surface and in the pores of the filtration membrane comprises bacteria, organic and inorganic species, non-biodegradable compounds. Thus, the term membrane fouling comprehensively refers to a series of phenomenon which comprise of pore adsorption, pore blocking or clogging, gel formation or cake formation.

Figure 5:
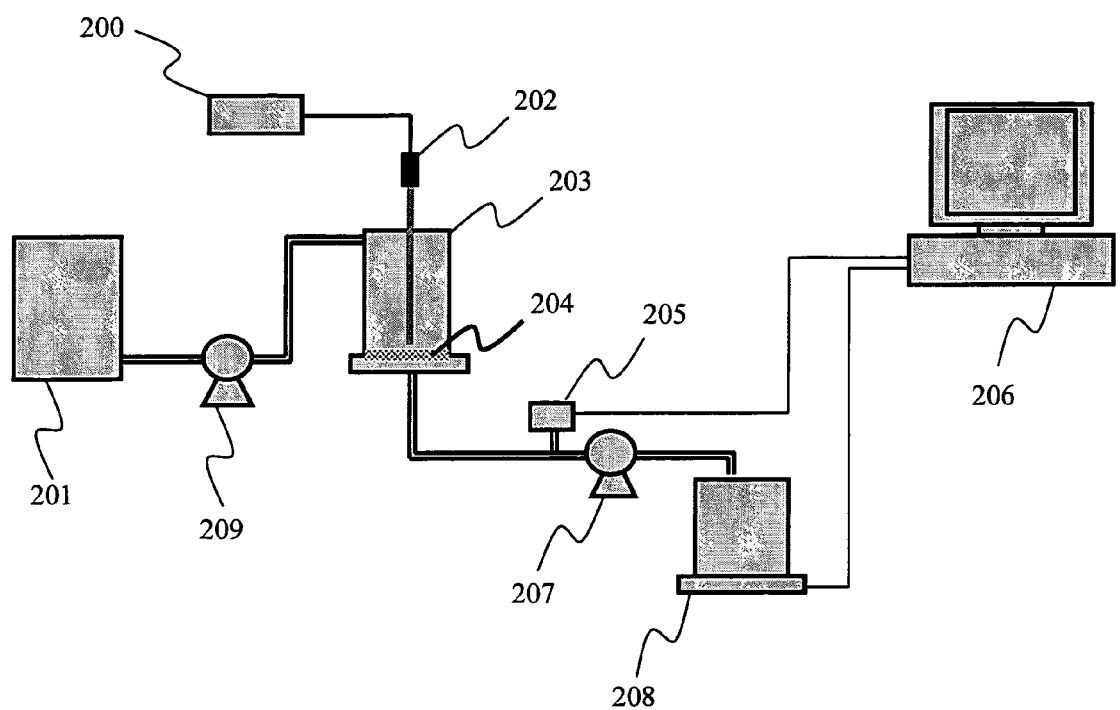
FIG. 5 shows the set-up for concurrent filtration and photocatalytic oxidation for the evaluation of membranes comprising 1D nanostructured material. The solution comprising a pollutant such as humic acid or methylene blue is introduced via a pump (209) from the storing tank (201) into the filtration cup (203) comprising the $TiO_2$ membrane (204). The solution comprising humic acid or methylene blue is filtered through the membrane (204). This suction force is driven by a pump (207) which is controlled by a computer (206) connected to a pressure sensor (205). The filtration cup also resembles a PCO reactor as it is connected to a UV lamp (202) which again is connected to a power supply for the lamp (200). The beaker (208) which is connected to the pump (207) and the filtration cup (203) takes up permeate passed through the $TiO_2$ membrane. The computer (206) is connected to the beaker (208) to measure the volume of permeate after cleaning in the filtration cup/PCO reactor (203).

Due to the photocatalytic properties of $TiO_2$ as already described above, the industry started to manufacture $TiO_2$ membranes. Titanium dioxide is also proposed to be used as adsorbent for the removal of contaminants due to its regenerative potential. The spent titanium dioxide can be regenerated via photocatalytic oxidation (PCO) process (Fang, H., Sun, D. D., et al., 2005, Water Science & Technology, vol. 51, no. 6-7, p. 3'73-380). The PCO process has been reported as a possible alternative for removing organic matters from potable water. A redox environment will be created in a PCO process to mineralize the NOM's and sterilize the bacteria adsorbed on the surface of the photocatalyst into carbon dioxide and water when the semiconductor photocatalyst is illuminated by light source (usually UV light) in a PCO process. The theoretical basis for photocatalysis in general is reviewed by Hoffmann, M. R., Martin, S. T., et al. (1995, Chem. Rev., vol 95, 69-96) and by Fox, M. A. and Dulay, M. T. (1993, Chem. Rev., vol. 93, p. 341-35'7). An exemplary setup for a water recycling apparatus which makes use of the PCO process and a membrane obtained by the method of the present invention is illustrated in FIG. 5 and will be explained in more detail in the experimental section of this application.

It has been demonstrated that the membranes obtained by the method of the present invention provide excellent performance on concurrent filtration and photocatalytic degradation of humic acids in water. Humic acids (HA) in water are harmful compounds with a complex nature composed of carboxylic, phenolic and carbonyl functional groups. These substances cause a brown-yellow color in water and are known to be the precursor of carcinogenic halogenated compounds formed during the chlorination disinfection of drinking water. The experiments also demonstrated that $TiO_2$ membrane fouling caused by HA accumulation has been alleviated by the concurrent photocatalytic degradation.

Therefore, the present invention is also directed to a filtration membrane obtained by a method of the present invention and also to a method of cleaning wastewater comprising filtering wastewater through a filtration membrane of the present invention or a filtration membrane which has been fabricated according to the method of the present invention.

The term "Wastewater" "raw water" or "sewage" as used herein includes municipal, agricultural, industrial and other kinds of wastewater. In general, any kind of wastewater can be treated using the membrane obtained by the method of the present invention. In one example, the wastewater has a total organic carbon content (TOC) of about 20 mg/l. In another example, the wastewater has already been treated to remove trace organics or soluble organics from the wastewater before filtering it through the filtration membrane of the present invention.

The membrane of the present invention can also be used for indoor air quality control in removing the contaminants if wastewater is replaced by air. The membrane can also be used as electrode for dye-sensitized solar cell and hydrogen production processes.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION 1.1 Synthesis of $TiO_2$ Nanowire Membrane Using Hydrothermal Synthesis FIG. 1(b) gives a schematic overview of one way of fabricating a $TiO_2$ nanotube/nanowire or fiber filtration membrane using the $TiO_2$ nanotube/nanofiber synthesized by hydrothermal reaction. The fabrication of $TiO_2$ nanowire referred to literatures (Yuan, Z.-Y. and Su, B.-L., 2004, supra; Yoshida, R., Suzuki, Y., Yoshikawa, S., 2005, supra; Armstrong, A. R., Canales, G. A. J. and Bruce, P. G., 2004, Angewandte Chemie International Edition, vol. 43, p. 2286). 0.20 g of $TiO_2$ powder (P25, Degussa) (up to 30 g can be used) has been mixed with 30 ml 10 M NaOH solution in 45 ml Teflon-lined autoclave container. After the hydrothermal reaction in an furnace for 2 days at 180° C., a white pulp suspension consisting of long nanowires has been collected, washed with distilled water and dilute hydrochloric acid solution (pH 2) for 3 times ($HNO_3$ can also be used). Subsequently 0.1 wt.-% surfactant (F-127) has been added into the nanowire suspension. A vacuumfilter with glass filter (Advantec, GC-50, pore size: 0.45 µm) has been used to filter the $TiO_2$ nanowire suspension (5 to 100 kPa) and a $TiO_2$ nanowire membrane has been formed owing to the accumulation of $TiO_2$ nanowires on the surface of the glass filter. Residual surfactant left in the membrane has been subsequently washed away with distilled water. After the $TiO_2$ nanowire membrane has been dried at room temperature, the glass filter has been removed leaving the free-standing $TiO_2$ nanowire membrane for calcination in a furnace at 700° C. for 2 h with a ramp of 2° C./min.

The as-prepared $TiO_2$ nanowire membrane is shown in FIGS. 7 and 8(a). The 47 mm-diameter membrane shown in FIG. 8(a) has been fabricated using a simple filtration method, and larger diameter membranes have also been produced. This filtration method has several advantages: (1) Homogeneity of the $TiO_2$ nanowire distribution can be formed through filtration process itself. (2) The membrane thickness is easily controlled from hundreds of nanometer to thicker by simply adjusting the nanowire concentration and volume of the suspension filtered. The $TiO_2$ nanowire membranes used herein have been about 15 µm in thickness and 0.05 g in weight. (3) The $TiO_2$ nanowire membrane is highly flexible before calcination, with no observed change in its shape after repeated flexure as shown in FIG. 8(b). Calcination above 300° C. ensures the membrane retains its desired shape. Flexible property enables the membrane to be formed into various membrane modules for larger commercial applications. A cylindrical $TiO_2$ nanowire membrane module formed using the flat membrane is shown in FIGS. 8(c) and (d).

1.2 Membrane Characterization

The morphologies of the $TiO_2$ nanowire membrane have been examined using scanning electron microscopy (SEM), Leica LT7480 and field emission scanning electron microscopy (FESEM), JEOL 6340. The crystal structure and the phase composition have been analyzed using powder X-ray diffraction (XRD), Bruker AXS D8 advance. The morphologies of the $TiO_2$ nanowires have also been examined using a JEOL 2010 transmission electron microscopy (TEM).

Figure 9:
FIG. 9 shows a TEM image of the $TiO_2$ nanowires in the membrane with an average diameter between about 20-100 nm. The nanowires have been manufactured using hydrothermal synthesis. Scale bar 200 nm.
Figure 12:
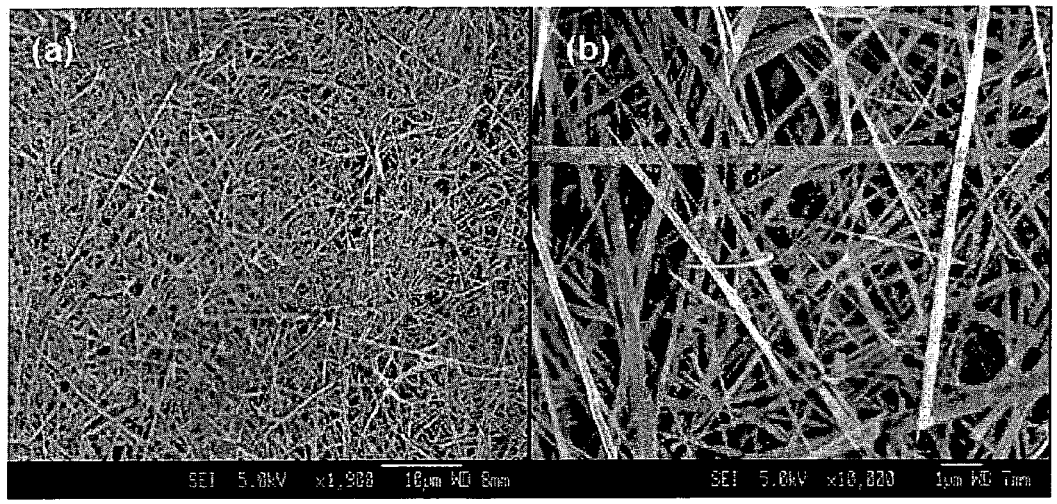

FIGS. 12(a) and 12(b) show the FESEM images of the $TiO_2$ nanowire membrane. No significant effect on the structure of the $TiO_2$ nanowires has been observed after calcination of the $TiO_2$ membrane from 300° C. to 700° C. From the FIGS. 12(a) and 12(b), it can be seen that the $TiO_2$ nanowire membrane has been formed by overlapping and interpenetrating of long nanowires with typical lengths in the range of several micrometers to tens of micrometers. TEM image of the $TiO_2$ nanowires membrane is shown in FIG. 9 and reveals that these $TiO_2$ nanowires are 20-100 nm in diameter.

Figure 18:
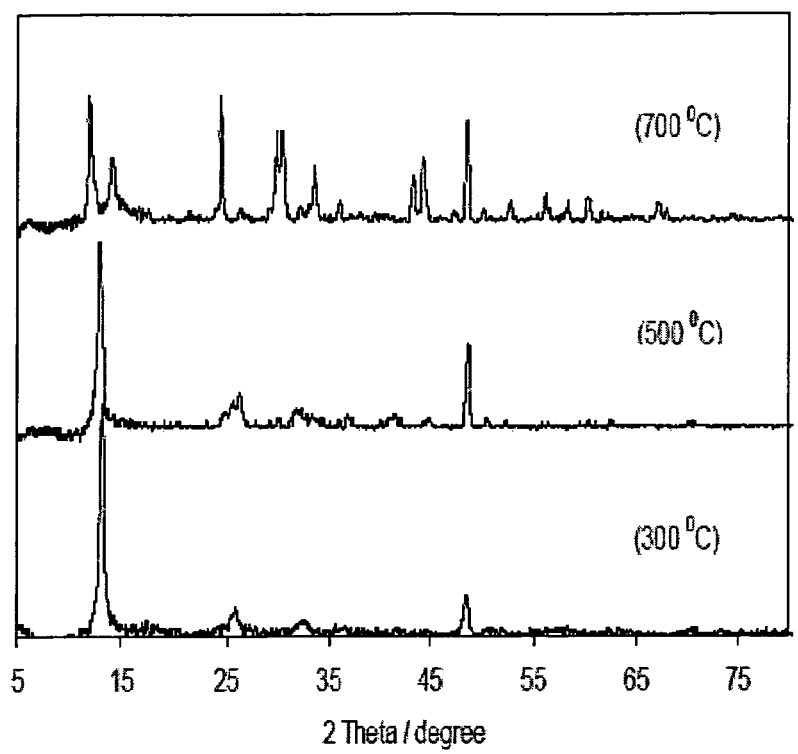
FIG. 18 shows a X-ray powder diffraction pattern of a $TiO_2$ nanowire membrane prepared at various temperatures (300° C., 500° C. and 700° C.). It indicates that the synthesized nanowires have a mixture of anatase $TiO_2$ and titanate. After calcination at the temperature range of 300-500° C., the $TiO_2$ and titanate have been $TiO_2$—B phase and $Na_2(Ti_{12}O_{25})$, respectively. After the calcinations at 700° C., the $TiO_2$—B phase has been transformed into anatase while $Na_2(Ti_{12}O_{25})$ tended to decompose to $Na_2(Ti_6O_{13})$ and anatase $TiO_2$. For more details see item 1.2 of the experimental section of this application.

XRD experiments have been performed in order to determine the crystal structure of the nanowire membrane after calcination at different temperature. The results are shown in FIG. 18. It indicates that the synthesized nanowires have a mixture of anatase TiO$_2$ and titanate. After calcination at the temperature range of 300-500° C., the TiO$_2$ and titanate have been TiO$_2$—B phase and Na$_2$(Ti$_{12}$O$_{25}$), respectively. After the calcinations at 700° C., the TiO$_2$—B phase has been transformed into anatase while Na$_2$(Ti$_{12}$O$_{25}$) tended to decompose to Na$_2$(Ti$_6$O$_{13}$) and anatase TiO$_2$. These XRD patterns agree well with the results reports in the literatures (Yuan, Z.-Y. and Su, B.-L., 2004, supra; Dong, W., Cogbill, A., et al., 2006, supra). Anatase TiO$_2$ has better photocatalytic activity than other phases TiO$_2$. Therefore, the TiO$_2$ nanowire membranes used for evaluation in this paper have been calcinated at 700° C.

1.3 Permeability of TiO$_2$ Nanowire Membrane

The permeability of the TiO$_2$ nanowire membrane has been measured using standard polystyrene (PS) microspheres (Nakao, S.-i., 1994, J. Mem. Sci., vol. 96, p. 131; Singh, S., Khulbe, K. C., 1998, J. Membr. Sci., vol. 142, p. 111). PS microspheres of 0.05, 0.1, 0.2, 0.5, 1 and 2 μm in diameter, which have been purchased from Alfa Aesar, have been dispersed in pure water to prepare 0.0033 wt.-% solution each. Different diameter size PS microspheres suspensions have been filtered in Millipore UF Stirred Cell. Presence of PS microspheres in feed and permeate has been detected via TOC analyzer and the concentration has been determined using the calibration curve. The separation factor (S.F.) of the TiO$_2$ nanowire membrane has been determined using the formula below: 100%

$$S.F. = \left(1 - \frac{C_{permeate}}{C_{feed}}\right) \times 100\% \quad (1)$$

Where $C_{permeate}$ and $C_{feed}$ are the PS solution concentration of permeate collected and the original feed, respectively.

The separation factors of the TiO$_2$ nanowire membrane for these microspheres are shown in Table 1. The separation factors for 0.5, 1 and 2 μm PS microspheres have been more than 99%, indicating that these microspheres of 0.5, 1 and 2 μm in diameter have been unable to pass through the TiO$_2$ nanowire membrane. The separation factor for microspheres decreased with the decrease of PS microsphere diameter. The separation factors for 0.1 and 0.05 μm microspheres have been 96.3% and 89.5%, respectively, indicating that the TiO$_2$ membrane can achieved partial removal of 0.1 and 0.05 μm microspheres. It has been known that the pore size of a synthetic membrane could be defined as the diameter of latex microspheres which are 90% retained by the membrane. So, pore size of the TiO$_2$ nanowire membrane is about 0.05 μm.

TABLE 1

Separation factors of the TiO$_2$ nanowire membrane for different diameter polystyrene microspheres

| PS (diameter, μm) | Separation factor | Error value |
|---|---|---|
| 0.05 | 89.5% | 1.9% |
| 0.1 | 96.3% | 1.3% |
| 0.2 | 98.5% | 0.4% |
| 0.5 | 99.2% | 0.1% |
| 1 | 99.7% | 0.1% |
| 2 | 99.9% | 0.1% |

1.4 Photocatalytic Oxidation and Membrane Filtration

The photocatalytic activity and filtration of the TiO$_2$ nanowire membrane have been evaluated in dead-end filtration equipment of a PCO reactor as shown in FIG. 5. Humic Acid (HA, Fluka) has been chosen as the model contaminant in this experiment. HA solution has been prepared in deionized water. The UV light source, an 11 W Upland 3SC9 Pen-ray lamp (254 nm) has been immersed into solution, 1 cm above the TiO$_2$ nanowire membrane. The volume of filter cup has been 250 ml. HA concentration in solution has been measured by monitoring the absorbance at 436 nm on a UV-visible spectrophotometer, and the total organic matter (TOC) concentration has been measured on a Shimadzu TOC-Vcsh TOC analyzer.

The photocatalytic activity of the TiO$_2$ nanowire membrane has been evaluated in batch operation mode. 250 ml HA solution of 15 mg/L has been added in to the filter cup, then turned on the UV lamp. Samples have been withdrawn from the filter cup using a syringe at intervals of 15 min for analyses. 0.05 g P25 TiO$_2$ powder has been deposited on the surface of a glass filter (0.45 μm) via filtering P25 suspension. The P25 deposited glass filter has been used as a reference. The direct photolysis of HA under UV irradiation has also been carried out. Photocatalytic oxidation usually fitted Langmuir-Hinshelwood (L-H) kinetics model:

$$r = \frac{dC}{dt} = \frac{kKC}{1+KC} \quad (2)$$

Where r is the oxidation rate of the reactant (mg/l*min), C the concentration of the reactant (mg/l), t the illumination time, k the reaction rate constant (mg/l*min), and K is the adsorption coefficient of the reactant (l/min). When the chemical concentration $C_0$ is a millimolar solution ($C_0$ small) the equation can be simplified to an apparent first-order equation (Konstantinou, I. K., Albanis, T. A., 2004, Appl. Catal., B, vol. 49, p. 1):

$$\text{Ln}\left(\frac{C_0}{C_t}\right) = kKt = k_{app}t \quad (3)$$

A plot of ln $C_0/C_t$ versus time represents a straight line, the slope of which upon linear regression equals the apparent first-order rate constant $k_{app}$.

The filtration and anti-fouling ability of the TiO$_2$ nanowire membrane have been investigated in continuous operation mode. HA solution of 15 mg/l has been filtered using the TiO$_2$ nanowire membrane under UV irradiation. The HA concentration and TOC both in feed and in filtrate have been measured to calculate their removal rates. The membrane flux has been kept at 4, 8, 12 and 16 L/min·m$^2$, respectively. The filtration without UV irradiation has also been carried out as a reference.

The photocatalytic activity of the TiO$_2$ nanowire membrane has been investigated in the experiment setup (FIG. 5) in batch operation mode. The glass filter deposited with P25 TiO$_2$ powder has been used as a reference.

Figure 14:
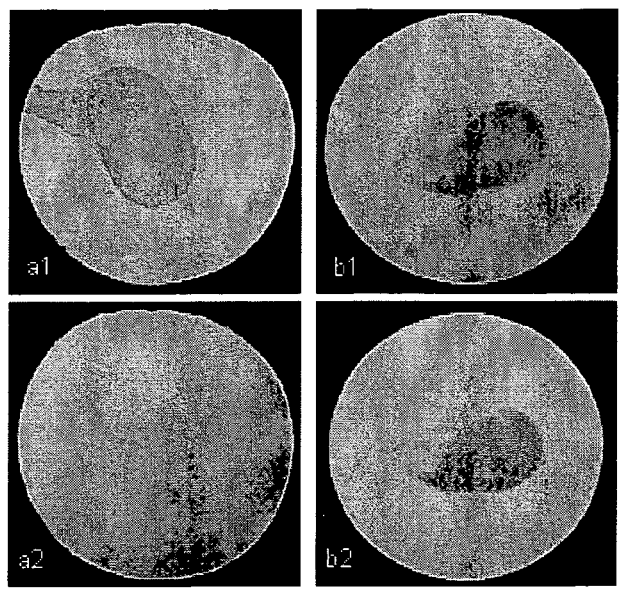
FIG. 14 demonstrates the photocatalytic degradation of methylene blue on a membrane composed of nanostructured material. a1: $TiO_2$ nanowire membrane before UV irradiation, a2: $TiO_2$ nanowire membrane after 30 min UV irradiation, b1: glass filter before UV irradiation, b2: glass filter after 30 min UV irradiation. This experiment demonstrates (see item 1.4 in the experimental section) that methylene blue had been completely degraded by $TiO_2$. This means that the $TiO_2$ membrane preformed very well on photodegradation.

The direct photolysis of methylene blue under UV irradiation has also been carried out. Methylene blue is a heterocyclic aromatic chemical compound with molecular formula: $C_{16}H_{18}ClN_3S$. To do so a marked glass filter using methylene blue has been put under the UV lamp. After 30 min of irradiation, the color still remained very well with a slight fading (FIGS. 14b1 and b2). However, under other identical conditions, the methylene blue marker on the TiO$_2$ nanotube membrane completely faded after 30 min of UV irradiation (FIGS. 14a1 and a2), indicating that methylene blue had been completely degraded by TiO$_2$. This means that the TiO$_2$ preformed very well on photodegradation.

Figure 17:
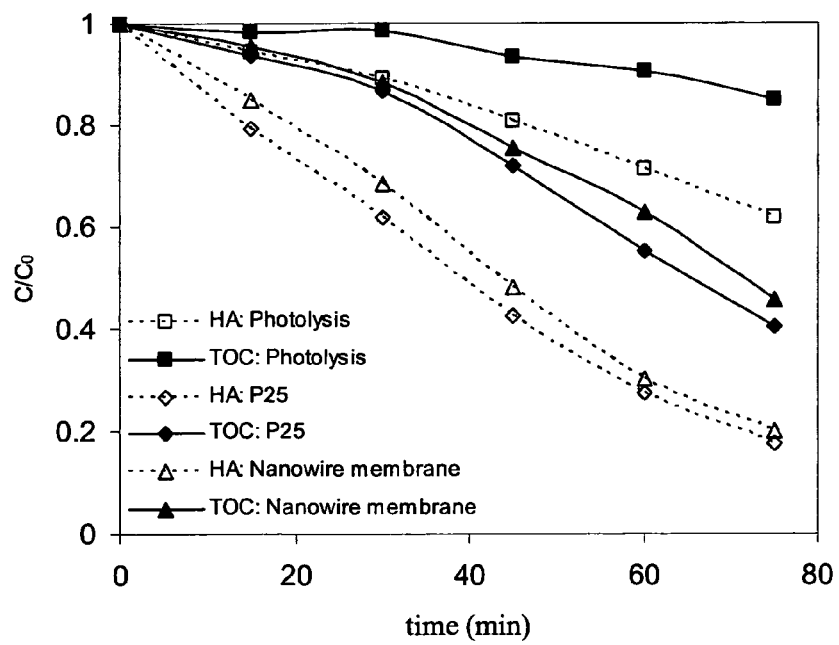
FIG. 17 demonstrates the removal of humic acid (HA) and total organic matter (TOC) over the course of photolysis, photocatalytic degradation of HA via P25 deposited glass filter and $TiO_2$ nanowire membrane. The measurements have been carried out in the batch operation mode which provided the following results.

The measurements carried out in the batch operation mode provided the following results: The changes in HA concentration and TOC over the course of the three processes are shown in FIG. 17. As shown in FIG. 17, the $TiO_2$ nanowire membrane shows satisfying photocatalytic activity, which is nearly the same as that of commercial P25 $TiO_2$. The photocatalytic degradation of HA in the processes follows first order kinetics. The apparent rate constant ($k_{app}$) for the $TiO_2$ nanowire membrane has been 0.022 $min^{-1}$ ($R^2$=0.97), almost identical to that of commercial P25 ($k_{app}$=0.023 $min^{-1}$, $R^2$=0.98). The TOC curves in FIG. 17 also indicate that similar mineralization rates between the $TiO_2$ nanowire membrane and P25 $TiO_2$. The reduction of TOC in the solution indicates the mineralization of most HA into carbon dioxide and water. Compared with the photocatalytic degradation in the presence of either the $TiO_2$ nanowire membrane or P25 $TiO_2$, the degradation of HA by photolysis without $TiO_2$ photocatalyst has been much slower. The apparent rate constant has been only 0.006 $min^{-1}$, one fourth of that of the photocatalytic degradations.

Figure 19:
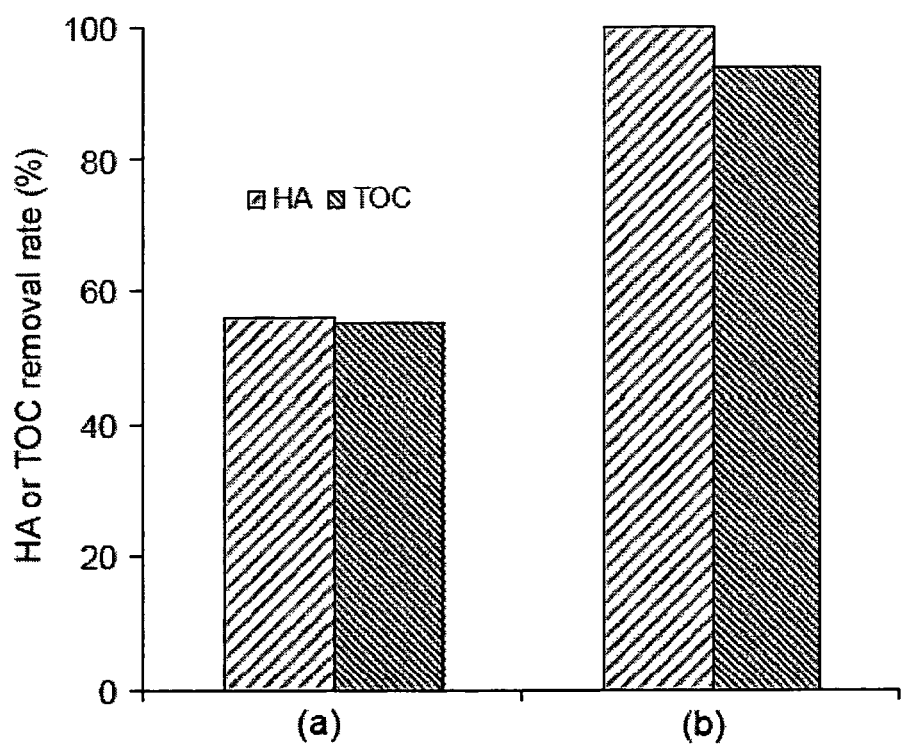
FIG. 19 shows the removal rate of humic acid (HA) and TOC by a $TiO_2$ nanowire membrane filtration (a) without and (b) with UV irradiation. The nanowire has been fabricated using hydrothermal synthesis and being used in an apparatus shown in FIG. 5.

During membrane filtration, HA gradually accumulated on the membrane surface or block the membrane pore resulting in pressure driven increase or membrane flux decline which is called membrane fouling. Membrane fouling is the main obstacle in membrane filtration as it causes the reduction in productivity and increase of operation cost because backwashing or chemical cleaning are required to restore the membrane flux. In contrast, this main obstacle does not exist in $TiO_2$ nanowire membrane. Under UV irradiation, the $TiO_2$ nanowires can be excited to generate high oxidative species, holes ($h^+$) and hydroxyl radicals ($OH^-$). As discussed above, HA can be effectively degraded photocatalytically into carbon dioxide and water or break down into small molecule weight matters, which cause no or less membrane fouling. Therefore, the fouling of $TiO_2$ nanowire membrane would be alleviated if a UV light is used to irradiate the $TiO_2$ nanowire membrane during the filtration. To investigate the anti-fouling ability of the $TiO_2$ nanowire membrane, HA solution of 15 mg/l was filtered using the $TiO_2$ nanowire membrane in continuous operation mode. The membrane flux has been kept a constant at 4 L/min*$m^2$. The filtration without concurrent UV irradiation has also been carried out as a reference. The removal rates of HA and TOC by the two processes are shown in FIG. 19. It clearly indicates that 57% of HA has been rejected using the $TiO_2$ nanowire membrane alone. With concurrent UV irradiation on $TiO_2$ nanowire membrane, the HA removal rate nearly reaches 100% owing to concurrent filtration and photocatalytic degradation. It also reveals that 93.6% of TOC have been removed by the $TiO_2$ nanowire membrane with concurrent UV irradiation.

Figure 15:
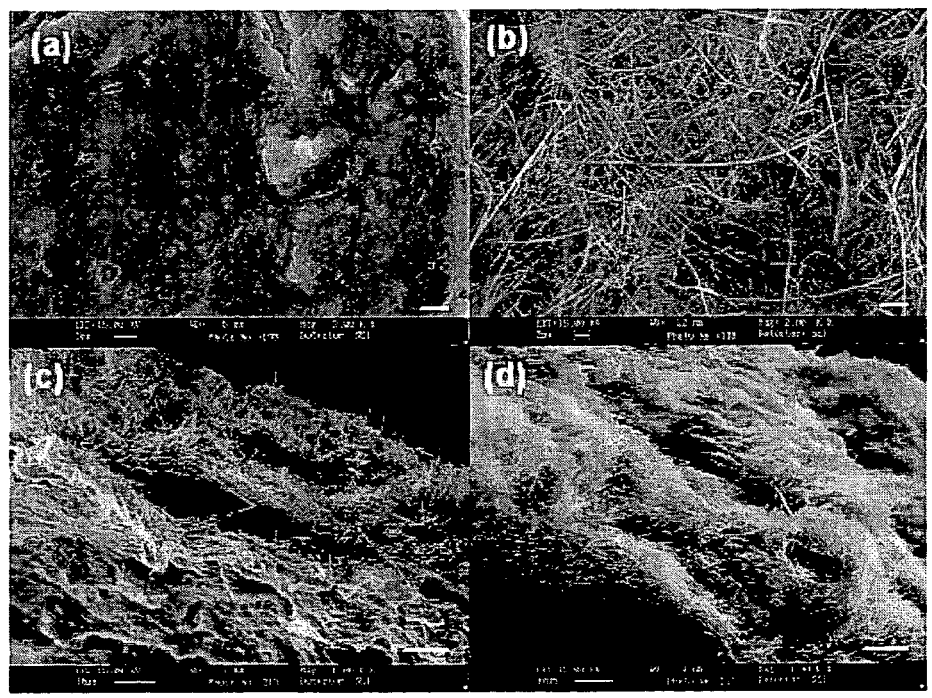
FIG. 15 shows SEM images of a $TiO_2$ nanowire membrane surface and cross section after filtration in the filtration apparatus shown in FIG. 5.
Figure 20:
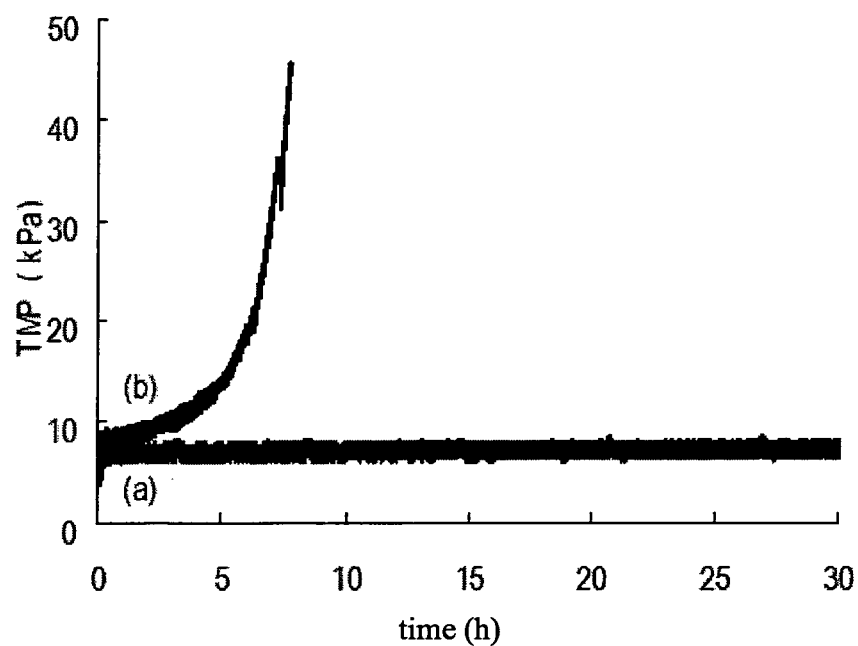
FIG. 20 shows changes of the transmembrane pressure (TMP) at a $TiO_2$ nanowire membrane during a filtration in an apparatus shown in FIG. 5. The nanowire has been fabricated using hydrothermal synthesis. It can be seen that the TMP of the $TiO_2$ nanowire membrane without UV irradiation gradually increased with the filtration time and increased sharply after 7 h of filtration (curve b). However, the change of TMP of the $TiO_2$ nanowire membrane with concurrent UV irradiation has been different (curve a). The TMP increased slightly at the initial stage and then kept a constant throughout the rest filtration time. A constant TMP throughout the 30 h filtration indicated the TiO$_2$ nanowire membrane fouling did not occur. For more details see item 1.4 in the experimental section of the application.

The transmembrane pressure (TMP) during filtration with and without UV irradiation have been recorded by a pressure sensor and shown in FIG. 20. It can be seen that the TMP of the $TiO_2$ nanowire membrane without UV irradiation gradually increased with the filtration time and increased sharply after 7 h of filtration. However, the change of TMP of the $TiO_2$ nanowire membrane with concurrent UV irradiation has been different. The TMP increased slightly at the initial stage and then kept a constant throughout the rest filtration time. A constant TMP throughout the 30 h filtration indicated the $TiO_2$ nanowire membrane fouling did not occur. After filtration, the $TiO_2$ nanowire membranes have been characterized using SEM. The images of the $TiO_2$ nanowire membrane surface and the cross section are shown in FIG. 15. It can be seen that in the absence of UV irradiation, a thick HA layer has been formed on the membrane surface (FIG. 15(a)) and less HA has been found inside of the membrane (FIG. 15(c)). It indicates that the $TiO_2$ nanowire membrane fouling is mainly attributed to the HA cake layer accumulated on the $TiO_2$ nanowire membrane surface. While, with concurrent UV irradiation during filtration, no HA cake layer has been found both on the membrane surface and inside of membrane pore. This evidence (FIGS. 15(b) and (d)) indicates that photocatalytic degradation occurred on the $TiO_2$ nanowire membrane and effectively eliminated the HA fouling.

Figure 21:
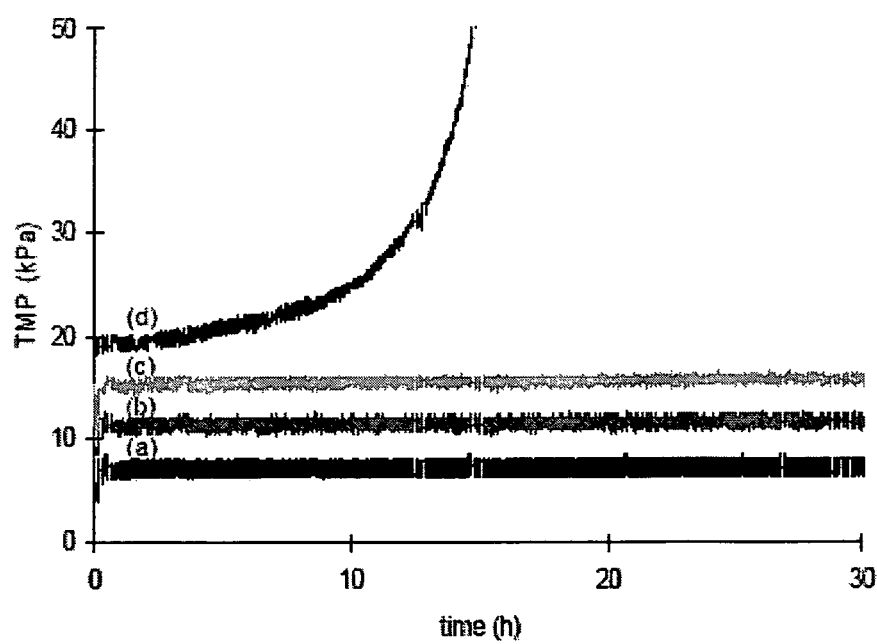
FIG. 21 shows transmembrane pressure (TMP) changes of a TiO$_2$ nanowire membrane during a filtration at different flux. The nanowire has been fabricated using hydrothermal synthesis.

For the $TiO_2$ nanowire membrane filtration, the photocatalytic degradation capacity of the $TiO_2$ membrane, the maximal amount of HA photocatalytically degraded per unit time (M1), is a function of membrane area and light intensity on the membrane surface. During filtration, the amount of HA rejected on membrane surface per unit time (M2) is a function of flux and HA concentration. When M2 is less than M1, the HA rejected on membrane surface can be completely photocatalytically degraded so that the $TiO_2$ nanowire membrane fouling will be eliminated. Whereas, when M2 is greater than M1, the HA rejected on $TiO_2$ nanowire membrane surface can not be completely degraded so that the HA will be accumulated on $TiO_2$ nanowire membrane surface resulting in the membrane fouling. When the concentration of HA in feed is constant, M2 is a function of only membrane flux. Fouling will not occur when operating below the critical flux of $TiO_2$ nanowire membrane. The continuous filtration of 15 mg/L HA using the $TiO_2$ nanowire membrane under UV irradiation has been carried out at different flux, 4, 8, 12 and 16 L/min*$m^2$. The TMP has been measured during filtration at the four fluxes to determine the membrane fouling as shown in FIG. 21. From the FIG. 21, it can be observed that the TMP gradually increased with the filtration time after 12 h of filtration at 16 L/min*$m^2$, which indicates increasing HA accumulate on membrane surface resulting in membrane fouling. In contrast, TMP remains constant at flux of 4, 8 and 12 L/min*$m^2$, indicating no membrane fouling occurs. Therefore 12 L/min*$m^2$ is the critical flux of the $TiO_2$ nanowire membrane.

2.1 Synthesis of $TiO_2$ Nanotube Membrane Using Hydrothermal Synthesis

The difference between this procedure and the one referred to under item 1 is the current one use $TiO_2$ nanotube and the later use $TiO_2$ nanofiber(wire).

The hydrothermal reaction condition for fabrication of $TiO_2$ nanotube: 0.3 g $TiO_2$ particle (P25) has been mixed into 40 ml 10 M NaOH in 45 ml Teflon-lined autoclave. After the hydrothermal reaction in a furnace for 2 days at 150° C., a white pulp-like product of the long nanofibers has been collected, washed with distilled water and diluted in hydrochloric acid (0.1 M) for 3 times. At the end, the as-synthesized nanotubes are gained.

The procedure for preparation of the $TiO_2$ nanotube suspension is the same as that for the preparation of the $TiO_2$ nanowire suspension form the hydrothermal synthesized $TiO_2$ nanowire and nonionic surfactant F127 in example referred to under item 1. The filtration has also been carried out in the same way as previously described under item 1.

The procedure for drying and calcining of the $TiO_2$ nanotube membrane is same as that in the one described under item 1. However, the calcination temperature is of 450° C., because a higher calcination temperature would result in the collapse of the nanotube structure.

Figure 10:
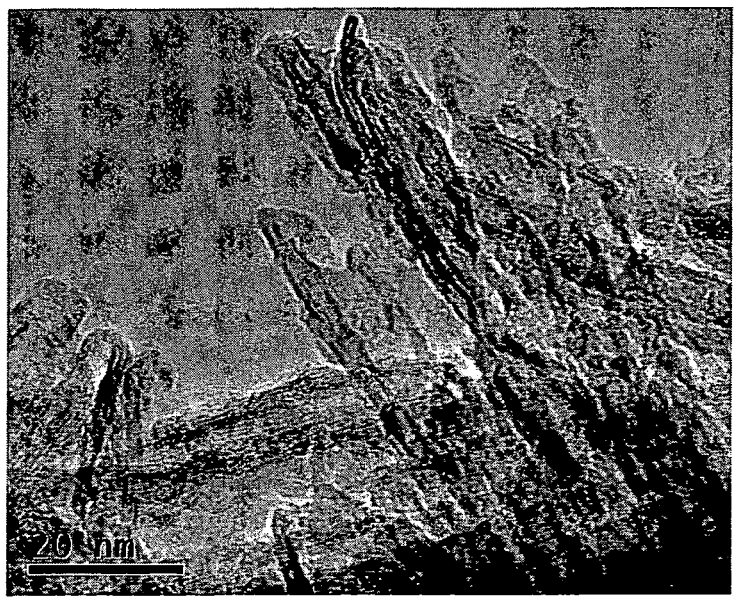
FIG. 10 shows a TEM image of $TiO_2$ nanotubes synthesized by hydrothermal synthesis. For more details see item 2.1 in the experimental section of the application.
Figure 11:
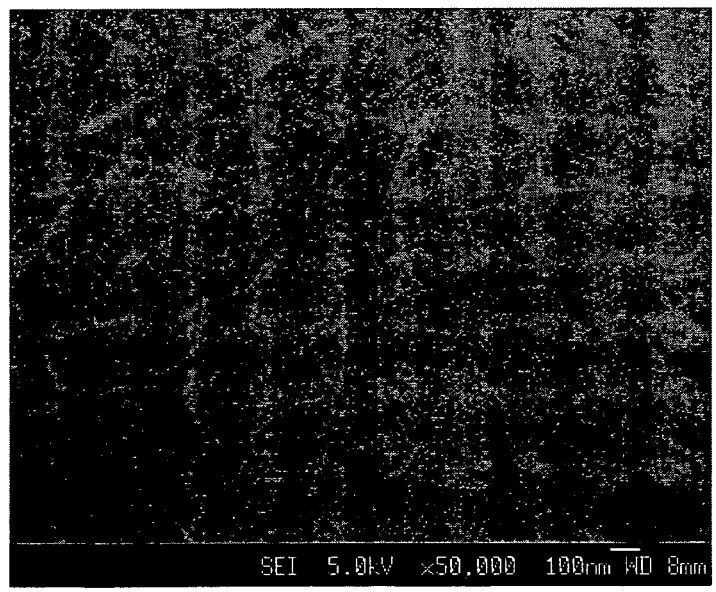
FIG. 11 shows a FESEM image of a membrane made of $TiO_2$ nanotubes wherein the nanotubes have been fabricated using hydrothermal synthesis. For more details see item 2.1 in the experimental section of the application.

FIG. 10 shows the TEM image of the $TiO_2$ nanotube fabricated from hydrothermal reaction. FIG. 11 shows an image of the $TiO_2$ nanotube membrane fabricated from hydrothermal nanotube pulp suspension. The pore size within the $TiO_2$ nanotube membrane is between about 5-10 nm, the thickness of the membrane is about 200 nm.

Figure 6:
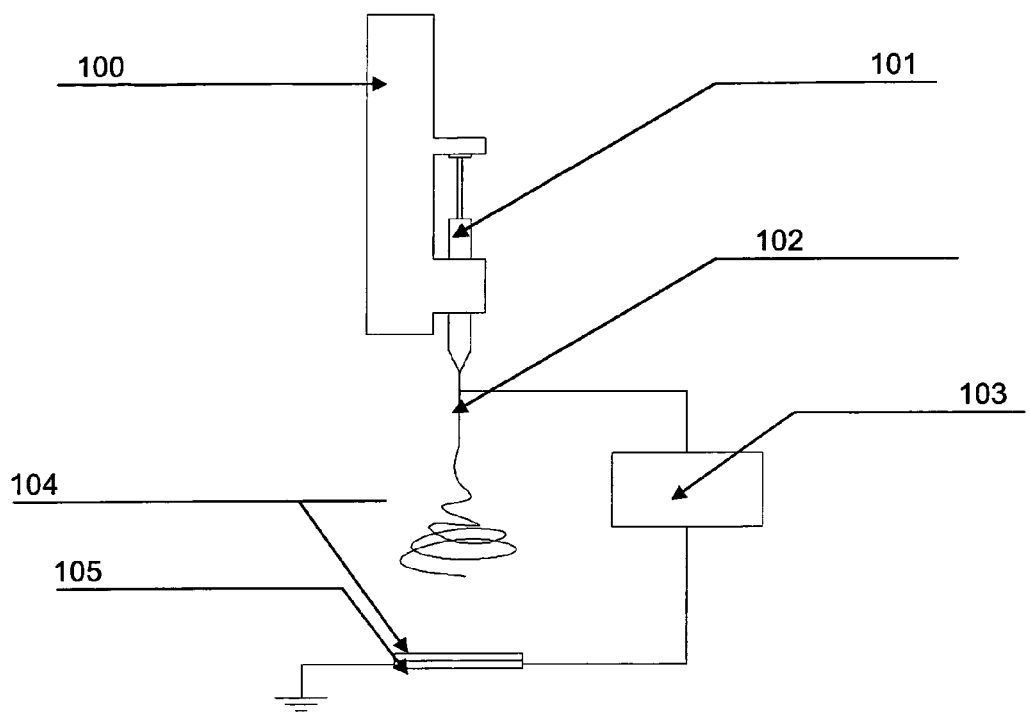
FIG. 6 shows the set-up of an electrospinning apparatus with the syringe pump (100) and the syringe (101) comprising the precursor material for electrospinning. The precursor material is ejected through the needle (102). Formation of a fiber is induced by a voltage difference between the needle (102) and the collector (conductive plate 105) which is created by a voltage source (103). As the fiber travels toward the surface of the collector (conductive plate 105), evaporation of the solvent in which the polymer or nanostructured material/precursor is dissolved occurs.

3.1 Fabricating TiO$_2$ Nanofiber Membrane Using the TiO$_2$ Fiber Synthesized by Electrospinning FIG. 6 shows typical electrospinning setup used to produce TiO$_2$ nanofibers mat. 0.937 g of an inorganic precursor which consists of titanium is mixed together with 2 ml of acetic acid (CH$_3$COOH) in a bottle (bottle A). The inorganic precursor is a metal alkoxide, industrially known as titanium isopropoxide (TiC$_{12}$H$_{28}$O$_4$). Titanium isopropoxide can be substituted with other metal alkoxides, such as titanium butoxide (TiC$_{16}$H$_{36}$O$_4$).

In another bottle (bottle B), 0.15 g of a polymer binder known as polyvinylpyrrolidone is dissolved in 3 ml of a solvent which is 1-propanol. The solution is stirred for at least 10 min to ensure that the polymer is fully dissolved. The content of bottle A is added into bottle B and stirred vigorously for 10 min to form a transparent pale yellow solution which is the final precursor to be used for electrospinning.

The electrospinning solution is loaded into a syringe with a size 23 gauge needle. The voltage applied for electrospinning is between about 10 to 15 kV. The distance from the needle tip to the ceramic membrane support is 200 mm. The ceramic membrane support provides mechanical strength to the electrospun fiber mat. These dimensions can also be used for electrospinning of other materials.

The procedure for preparing a suspension using the synthesized TiO$_2$ nanofibers obtained from the electrospinning process is same as the one described for the 1D nanostructured material (TiO$_2$ wires and tubes) obtained from the hydrothermal method (see item 1 and 2). The only difference between those methods is that in the current procedure the TiO$_2$ nanofiber and F127 are dispersed in anhydrous acetone. All other conditions are same.

The procedure for fabricating membrane by vacuum filtration of the TiO$_2$ nanofiber suspension is also the same.

The procedure of drying and calcining of the TiO$_2$ nanofiber membrane is also almost the same. However, the calcination temperature is about 500° C., because the membrane calcinated at this calcination temperature shows a better activity.

Figure 13:
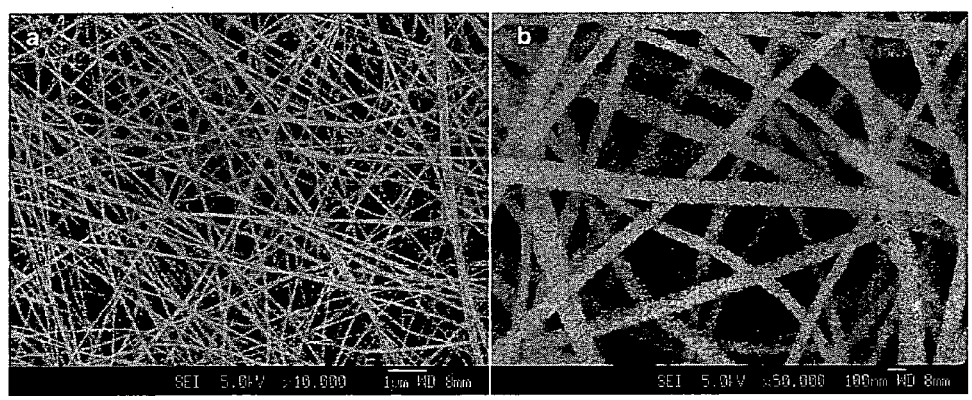

FIG. 13 shows images of the TiO$_2$ nanofiber membrane fabricated from electrospinning.

The pore size of the TiO$_2$ nanotube membrane is about 200 nm, the thickness is about 5 μm.

3.2 Photocatalytic Oxidation and Membrane Filtration

The photocatalytic activity and filtration of the TiO$_2$ nanofiber membrane obtained by electrospinning have been evaluated using the dead-end filtration equipment as described under item 1.4. However, instead of humic acid the current experiment uses methylene blue as model contaminant.

Figure 16:
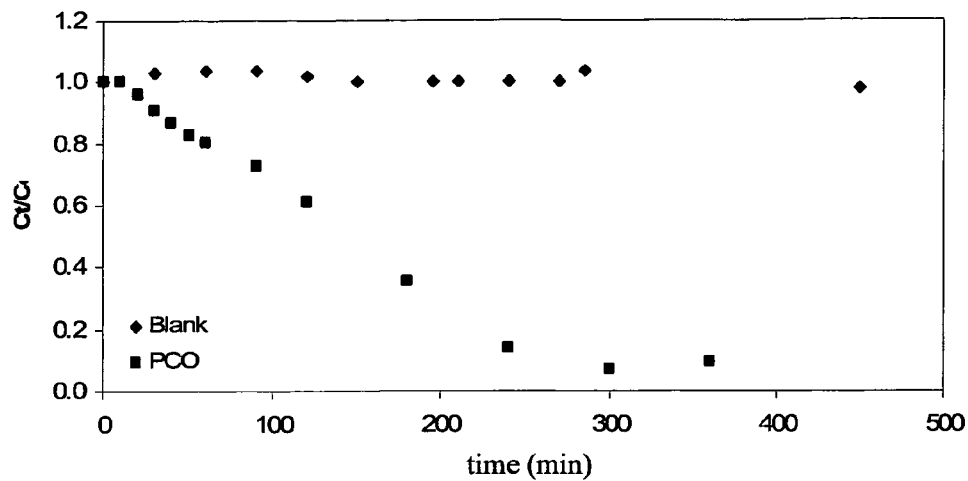
FIG. 16 shows a plot of normalized methylene blue concentration against time. It demonstrates the photo-degradation of methylene blue dye without UV (♦) and with UV (■). At 300 min, the system is able to achieve a 90% removal rate of methylene blue in the solution. The half-life of the photo-degradation is 145 min. The experiment has been carried out in the reactor system shown in FIG. 5 with a $TiO_2$ membrane which is composed of nanofibers obtained by electrospinning. For more details see item 3.2 in the experimental section of this application.

The concentration of the methylene blue in the photocatalytic oxidation (PCO) reactor has been 10 mg/L. Plot of normalized methylene blue concentration against time is shown in FIG. 16. At 300 min, the system is able to achieve a 90% removal rate of methylene blue in the solution. The half-life of the photo-degradation is 145 min. The degradation of the methylene blue dye is attributed to both photolysis and photocatalytic oxidation.

What is claimed is:

1. A method of fabricating a membrane made of a nanostructured material, wherein the method comprises:
   (a) preparing a suspension comprising at least one nanostructured material and at least one surfactant, wherein said nanostructured material is TiO$^2$ nanotubes, TiO$^2$ nanofibers, or a mixture thereof;
   (b) filtering said suspension through a porous substrate to form a membrane;
   (c) compressing said membrane using a hydraulic press at a temperature greater than 100° C.; and
   (d) calcining said compressed membrane
   wherein said nanostructured material is comprised in said suspension in a concentration of about 1 to 20 g/l.

2. The method according to claim 1, wherein said nanostructured material is dissolved in an organic or aqueous solvent.

3. The method according to claim 1, further comprising the step of dispersing said suspension before filtering.

4. The method according to claim 3, wherein for said dispersing ultrasonic radiation is carried out.

5. The method according to claim 4, wherein said nanostructured material is calcined before said suspension comprising at least one nanostructured material is prepared.

6. The method according to claim 1, wherein said drying is carried out at a temperature between about 20° C. to about 300° C.

7. The method according to claim 1, wherein said calcination is carried out at a temperature between about 300° C. to about 1000° C.

8. The method according to claim 1, further comprising removing said membrane from said substrate to obtain a freestanding membrane.

9. The method according to claim 8, wherein said membrane is removed from the substrate after or before said drying step.

10. The method according to claim 1, wherein the concentration of said surfactant is between about 0.01 to about 1 wt % based on the total weight of said resulting suspension.

11. The method according to claim 1, wherein said surfactant is selected from the group consisting of amphoteric surfactants, anionic surfactants, cationic surfactants and nonionic surfactants.

12. The method according to claim 11, wherein said anionic surfactant can be selected from the group consisting of sodium dodecyl sulfate (SDS), sodium pentane sulfonate, dehydrocholic acid, glycolithocholic acid ethyl ester, ammonium lauryl sulfate and other alkyl sulfate salts, sodium laureth sulfate, alkyl benzene sulfonate, soaps and fatty acid salts.

13. The method according to claim 11, wherein said nonionic surfactant is selected from the group consisting of poloaxamers, alkyl poly(ethylene oxide), diethylene glycol monohexyl ether, copolymers of poly(ethylene oxide) and polypropylene oxide), hexaethylene glycol monohexadecyl ether, alkyl polyglucosides, digitonin, ethylene glycol monodecyl ether, cocamide MEA, cocamide DEA, cocamide TEA and fatty alcohols.

14. The method according to claim 11, wherein said cationic surfactant is selected from the group consisting of cetyl trimethylammonium bromide (CTAB), dodecylethyldimethylammonium bromide, cetylpyridinium chloride (CPC), polyethoxylated tallow amine (POEA), hexadecyltrimethylammonium p-toluenesulfonate, benzalkonium chloride (BAC), and benzethonium chloride (BZT).

15. The method according to claim 11, wherein said amphoteric surfactant is selected from the group consisting of dodecyl betaine, sodium 2,3-dimercaptopropanesulfonate monohydrate, dodecyl dimethylamine oxide, cocamidopropyl betaine, 3-[N,N-dimethyl(3-palmitoylaminopropyl)ammonio]-propanesulfonate and coco ampho glycinate.

16. The method according to claim 1, wherein said nanostructured material is comprised in said suspension in a concentration of about 8 g/l.

17. The method according to claim 1, wherein the structure of said nanostructured material is selected from the group consisting of fibers, ribbons, tubes, wires, belts and mixtures thereof.

18. The method according to claim 1, wherein said porous substrate has a pore diameter of about 0.05 μm to about 2 μm.

19. The method according to claim 1, wherein said filtering is carried out using vacuum filtration or pressured filtration.

20. The method according to claim 19, wherein said vacuum filtration is carried out at a pressure of about 0.5 (50 kPa) bar to 1 (100 kPa) bar.

21. The method according to claim 1, wherein said nanostructured material is obtained by electrospinning.

22. The method according to claim 1, wherein said porous substrate has a shape which fits to a part or the whole of a structure in which form the membrane is supposed to be shaped.

* * * * *

UNITED STATES PATENT AND TRADEMARK OFFICE
CERTIFICATE OF CORRECTION

PATENT NO. : 8,414,806 B2
APPLICATION NO. : 12/161555
DATED : April 9, 2013
INVENTOR(S) : Darren Delai Sun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 356 days.

In the Claims:

Column 28, Line 46:
"polypropylene oxide), hexathylene glycol monohexadecyl" should read, --poly(propylene oxide), hexathylene glycol monohexadecyl--.

Signed and Sealed this
Thirteenth Day of May, 2014

Michelle K. Lee
*Deputy Director of the United States Patent and Trademark Office*